US007145471B2

(12) United States Patent
Purkis et al.

(10) Patent No.: US 7,145,471 B2
(45) **Date of Patent: *Dec. 5, 2006**

(54) SEQUENTIAL HYDRAULIC CONTROL SYSTEM FOR USE IN A SUBTERRANEAN WELL

(75) Inventors: Daniel G. Purkis, Aberdeenshire (GB); Michael A. Reid, Aberdeen (GB)

(73) Assignee: WellDynamics, Inc., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/213,438

(22) PCT Filed: Apr. 14, 2000

(86) PCT No.: PCT/US00/10116

§ 371 (c)(1),
(2), (4) Date: Oct. 1, 2002

(87) PCT Pub. No.: WO01/63089

PCT Pub. Date: Aug. 30, 2001

(65) Prior Publication Data

US 2003/0048197 A1 Mar. 13, 2003

Related U.S. Application Data

(63) Continuation-in-part of application No. 09/510,701, filed on Feb. 22, 2000, now Pat. No. 6,567,013.

(51) Int. Cl.
*G01V 3/00* (2006.01)
*E21B 43/12* (2006.01)
*E02B 27/00* (2006.01)

(52) U.S. Cl. .................... 340/853.3; 166/53; 166/336; 166/250.15

(58) Field of Classification Search .. 340/854.3–584.5; 166/53, 319, 380, 336, 375, 250.15, 250.17
See application file for complete search history.

(56) References Cited

U.S. PATENT DOCUMENTS

| | | | |
|---|---|---|---|
| 3,702,909 | A | 11/1972 | Kraakman |
| 3,906,726 | A | 9/1975 | Jameson |
| 3,970,144 | A | 7/1976 | Boykin, Jr. |
| 3,993,100 | A | 11/1976 | Pollard et al. |
| 4,036,106 | A | 7/1977 | Athy, Jr. |
| 4,197,879 | A | 4/1980 | Young |

(Continued)

FOREIGN PATENT DOCUMENTS

EP 0344060 A 11/1989

(Continued)

OTHER PUBLICATIONS

Office Action for Norwegian Patent Appl. No. 20023960 dated Aug. 22, 2005.

(Continued)

*Primary Examiner*—Jeffery Hofsass
*Assistant Examiner*—Kimberly Jenkins
(74) *Attorney, Agent, or Firm*—Martin R. Smith; Smith IP Services, P.C.

(57) ABSTRACT

A sequential hydraulic well control system provides actuator selection and operation utilizing pressure applied to hydraulic lines in a sequence. In a disclosed embodiment, an actuation control device of a well control system includes multiple pistons, at least one of which is included in a latch for selectively permitting and preventing displacement of another of the pistons. When one of the pistons displaces in response to pressure applied sequentially to hydraulic inputs of the control device, an associated actuator is placed in fluid communication with the inputs.

25 Claims, 12 Drawing Sheets

U.S. PATENT DOCUMENTS

| | | | |
|---|---|---|---|
| 4,234,043 | A | 11/1980 | Roberts |
| 4,296,910 | A | 10/1981 | Gratzmuller |
| 4,347,900 | A | 9/1982 | Barrington |
| 4,368,871 | A | 1/1983 | Young |
| 4,371,753 | A | 2/1983 | Graf |
| 4,407,183 | A | 10/1983 | Milberger et al. |
| 4,442,902 | A | 4/1984 | Doremus et al. |
| 4,476,933 | A | 10/1984 | Brooks |
| 4,522,370 | A | 6/1985 | Noack et al. |
| 4,549,578 | A | 10/1985 | Hibbs et al. |
| 4,660,647 | A | 4/1987 | Richart |
| 4,796,699 | A | 1/1989 | Upchurch |
| 4,942,926 | A | 7/1990 | Lessi |
| 4,945,995 | A | 8/1990 | Tholance et al. |
| 5,065,825 | A | 11/1991 | Bardin et al. |
| 5,174,189 | A | 12/1992 | Kamimura |
| 5,176,164 | A | 1/1993 | Boyle |
| 5,522,465 | A | 6/1996 | Deare |
| 5,547,029 | A | 8/1996 | Rubbo et al. |
| 5,887,654 | A | 3/1999 | Edwards et al. |
| 5,906,220 | A | 5/1999 | Thompson |
| 5,975,204 | A | 11/1999 | Tubel et al. |
| 6,179,052 | B1 | 1/2001 | Purkis et al. |
| 6,470,970 | B1 * | 10/2002 | Purkis et al. ............... 166/374 |

FOREIGN PATENT DOCUMENTS

| | | | |
|---|---|---|---|
| FR | 2052052 | A | 4/1971 |
| GB | 2335216 | A | 9/1999 |
| WO | WO 97/47852 | A | 12/1997 |
| WO | WO 98/39547 | A | 9/1998 |
| WO | WO 99/47788 | A | 9/1999 |
| WO | WO 00/09855 | A | 2/2000 |

OTHER PUBLICATIONS

Pending U.S. Appl. No. 09/503,276, filed, Feb. 14, 2000.

* cited by examiner

SEQUENTIAL HYDRAULIC CONTROL SYSTEM FOR USE IN A SUBTERRANEAN WELL

CROSS-REFERENCE TO RELATED APPLICATIONS

The present application is a U.S. national stage filing of International Application No. PCT/US00/10116, filed Apr. 14, 2000, and is a continuation in part of prior U.S. application Ser. No. 09/510,701, filed Feb. 22, 2000 now U.S. Pat. No. 6,567,013. The disclosures of these applications are incorporated herein by this reference.

BACKGROUND OF THE INVENTION

The present invention relates generally to operations performed in conjunction with subterranean wells and, in an embodiment described herein, more particularly provides a hydraulic well control system.

It is very advantageous to be able to independently control well tools from the earth's surface, or other remote location. For example, production from one of several zones intersected by a well may be halted due to water invasion, while production continues from the other zones. Alternatively, one zone may be in communication with a production tubing string, while the other zones are shut in.

In order to control multiple downhole well tools, various systems have been proposed and used. One type of system utilizes electrical signals to select from among multiple well tools for operation of the selected tool or tools. Another type of system utilizes pressure pulses on hydraulic lines, with the pulses being counted by the individual tools, to select particular tools for operation thereof.

Unfortunately, these systems suffer from fundamental disadvantages. The systems which use electrical communication or power to select or actuate a downhole tool typically have temperature limitations or are prone to conductivity and insulation problems, particularly where integrated circuits are utilized or connectors are exposed to well fluids. The systems which use pressure pulses are typically very complex and, therefore, very expensive and susceptible to failure.

From the foregoing, it can be seen that it would be quite desirable to provide a well control system which does not use electricity or complex pressure pulse counting mechanisms, but which provides a reliable, simple and cost effective means of controlling downhole tools. It is accordingly an object of the present invention to provide such a well control system and associated methods of controlling well tools.

SUMMARY OF THE INVENTION

In carrying out the principles of the present invention, in accordance with an embodiment thereof, a well control system is provided which utilizes hydraulic lines to select one or more well tools for operation thereof, and which utilizes hydraulic lines to actuate the selected well tool(s). The use of electricity downhole is not required, nor is use of complex pressure pulse decoding mechanisms required. Instead, the digital hydraulic well control system utilizes a sequential combination of pressure levels on the hydraulic lines to select a well tool for actuation, and uses pressure in one or more hydraulic lines to actuate the tool.

In one aspect of the present invention, a method of hydraulically controlling multiple well tools in a well is provided. A set of hydraulic lines is interconnected to each of the tools. At least one of the tools is selected for actuation thereof by generating a fluid pressure on a combination of the hydraulic lines in a predetermined sequence in which the fluid pressure is applied successively to selected ones of the combination of hydraulic lines.

The tool is not selected for operation thereof if either the pressure is applied to an inappropriate one of the hydraulic lines, or the pressure is applied to the proper hydraulic lines, but in the wrong sequence. Pressure pulse counting is not used.

The hydraulic lines are connected to an actuation control device of a well tool assembly, which also includes an actuator and a well tool operated by the actuator. When one or more of the control devices receives the correct sequence of pressure applications to the appropriate combination of the hydraulic lines, the control device permits fluid communication between certain of the hydraulic lines and the actuator. Fluid pressure from one or more of these hydraulic lines may then be used in the actuator to operate the tool. Preferably, the actuator is pressure balanced until these hydraulic lines are placed in fluid communication with the actuator.

The actuation control device includes a sequence detecting mechanism which places one or more hydraulic inputs to the control device in fluid communication with one or more hydraulic outputs of the control device when an appropriate sequence of pressure applications is received at the hydraulic inputs. Preferably, the hydraulic outputs are in fluid communication with each other until the appropriate sequence of pressure applications is received.

In another aspect of the present application, the actuation control device may also serve as an actuator. It may include an actuator member which is displaced when the sequence detecting mechanism detects that an appropriate sequence of pressure applications is received at hydraulic inputs of the device.

These and other features, advantages, benefits and objects of the present invention will become apparent to one of ordinary skill in the art upon careful consideration of the detailed description of representative embodiments of the invention hereinbelow and the accompanying drawings.

DETAILED DESCRIPTION

Figure 1:
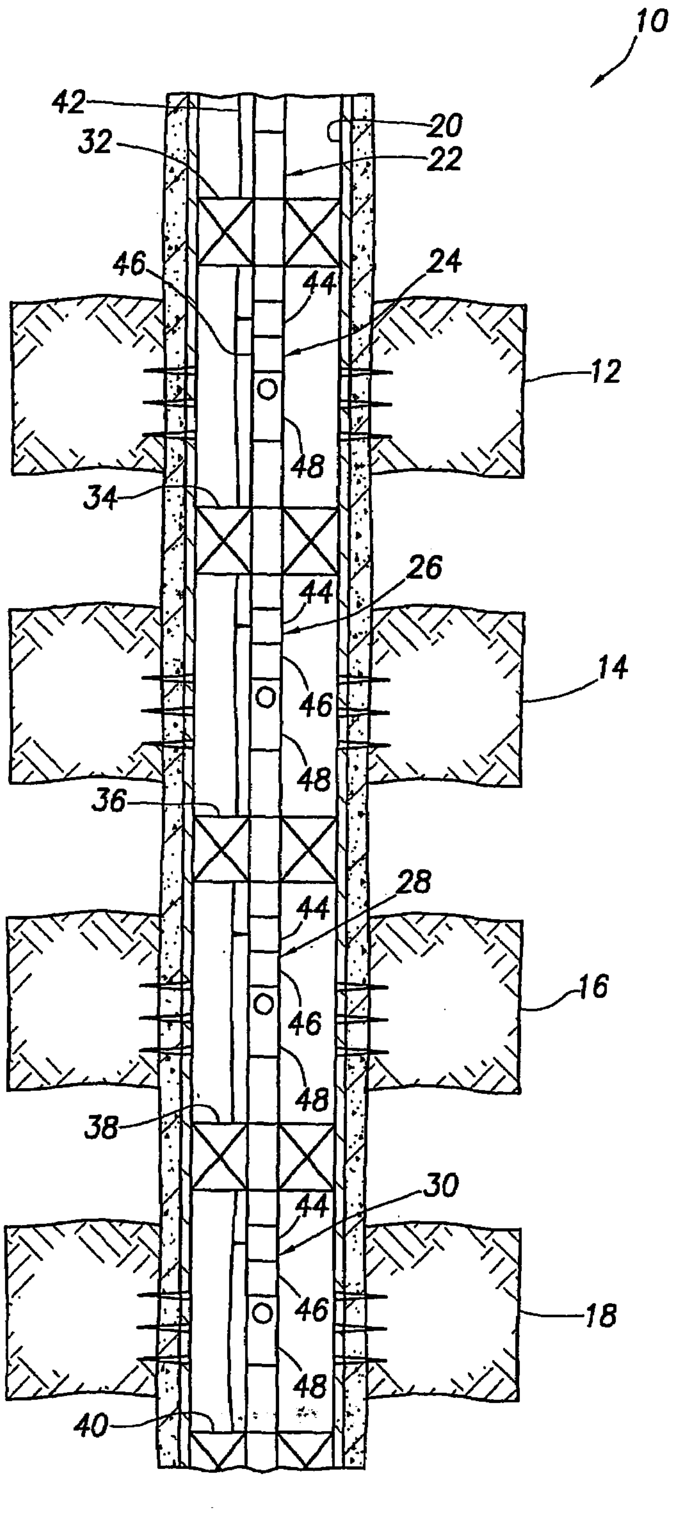
FIG. 1 is a schematic view of a method embodying principles of the present invention.

Representatively illustrated in FIG. 1 is a method 10 which embodies principles of the present invention. In the following description of the method 10 and other apparatus and methods described herein, directional terms, such as "above", "below", "upper", "lower", "right", "left", etc., are used only for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention.

In the method 10 as depicted in FIG. 1, four subterranean zones 12, 14, 16, 18 are intersected by a wellbore 20. The following description of the method 10 assumes that it is desired to produce fluid to the earth's surface from one or more of the zones 12, 14, 16, 18 via a production tubing string 22. However, it is to be clearly understood that the principles of the present invention are not limited to production wells, production from multiple zones, or any of the specific details of the method 10 as described herein. For example, principles of the present invention may be used in injection wells, in wells where fluid flow from, or into, a single formation is to be controlled, in methods where an aspect of the well other than fluid flow is to be controlled, etc. Thus, the method 10 is described herein as merely an example of the wide variety of uses for the principles of the present invention.

The production tubing string 22 as depicted in FIG. 1 includes four well tool assemblies 24, 26, 28, 30. The tubing string 22 also includes packers 32, 34, 36, 38, 40 isolating the zones 12, 14, 16, 18 from each other and from portions of the wellbore 20, according to conventional practice. Representatively, the tool assemblies 24, 26, 28, 30 are valve assemblies used to permit or prevent fluid flow between the zones 12, 14, 16, 18 and the interior of the tubing string 22, but it is to be clearly understood that the tool assemblies could include other types of well tools, such as chokes, injectors, instruments, etc.

To permit production of fluid from zone 12, valve assembly 24 is opened, thereby permitting fluid communication between the tubing string 22 and the wellbore 20 between packers 32 and 34. To prevent production of fluid from zone 12, valve assembly 24 is closed, thereby preventing fluid communication between the tubing string 22 and the wellbore 20 between packers 32 and 34. Similarly, the other valve assemblies 26, 28, 30 may be used to permit or prevent production of fluid from the respective zones 14, 16, 18.

Actuation of the valve assemblies 24, 26, 28, 30 is accomplished by means of hydraulic lines 42 interconnected to each of the valve assemblies. The hydraulic lines 42 extend to the earth's surface, or another remote location, where fluid pressure on each of the lines may be controlled using conventional pumps, valves, accumulators, computerized controls, etc. In one important aspect of the present invention, one or more of the lines 42 may also be used to select one or more of the valve assemblies 24, 26, 28, 30 for actuation thereof.

Each of the valve assemblies 24, 26, 28, 30 includes an addressable control device 44, an actuator 46 and a valve 48 or other well tool. The hydraulic lines 42 are interconnected to each of the control devices 44. Each of the control devices 44 has at least one address, and multiple ones of the control devices may have the same address. When a combination of pressure levels on certain ones of the hydraulic lines 42 matches an address of one of the control devices 44, the corresponding valve assembly 24, 26, 28 and/or 30 is selected for actuation thereof.

When a valve assembly 24, 26, 28 and/or 30 is selected, fluid pressure on one or more of the hydraulic lines 42 may then be used to actuate the selected assembly or assemblies. Thus, the method 10 does not require the use of electricity downhole to select or actuate any of the valve assemblies 24, 26, 28 or 30, and does not require a series of pressure pulses to be decoded at each of the assemblies. Instead, the method 10 is performed conveniently and reliably by merely generating a combination of pressure levels on certain ones of the hydraulic lines 42 to address the desired control device(s) 44, and utilizing fluid pressure on one or more of the hydraulic lines to actuate the corresponding selected well tool(s) 48. The specific hydraulic lines used to select the tool assembly or assemblies for actuation thereof may or may not also be used to actuate the selected assembly or assemblies.

Figure 2:
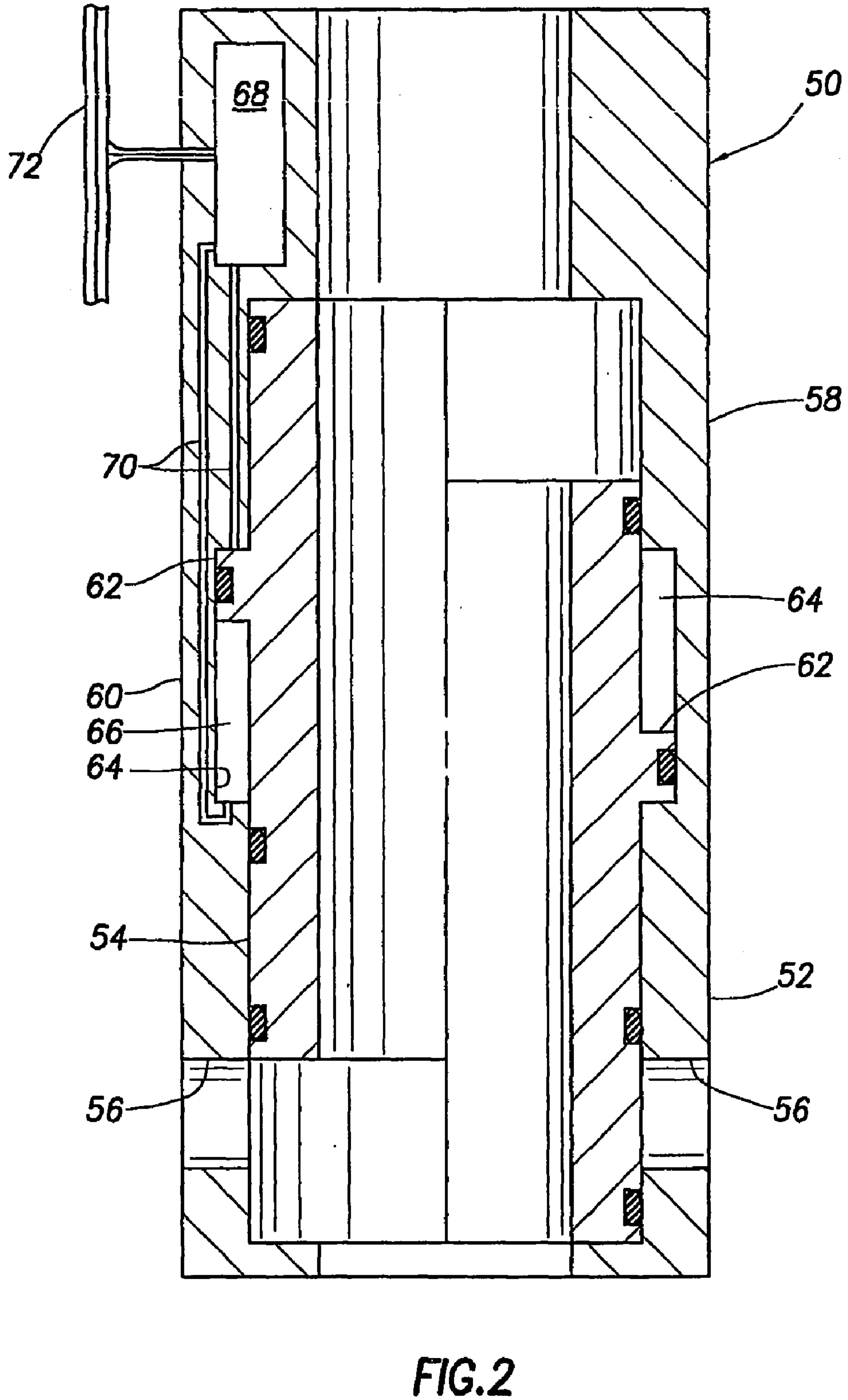
FIG. 2 is a schematic cross-sectional view of a well tool that may be used in the method of FIG. 1.

Referring additionally now to FIG. 2, a valve assembly 50 is schematically and representatively illustrated. The valve assembly 50 may be used for one of the tool assemblies 24, 26, 28, 30 in the method 10. Of course, other valve assemblies and other types of tool assemblies may be used in the method 10, and the valve assembly 50 may be configured differently from that shown in FIG. 2, without departing from the principles of the present invention.

The valve assembly 50 includes a valve portion 52 which is of the type well known to those skilled in the art as a sliding sleeve valve. Thus, the valve portion 52 includes an inner sleeve 54 which is displaced upwardly or downwardly to thereby permit or prevent fluid flow through ports 56 formed radially through an outer housing 58. The housing 58 may be interconnected in the tubing string 22 of the method 10 by, for example, providing appropriate conventional threads thereon.

The sleeve 54 is caused to displace by fluid pressure in an actuator portion 60 of the valve assembly 50. The actuator portion 60 includes a part of the sleeve 54 which has a radially enlarged piston 62 formed thereon. The piston 62 reciprocates within a radially enlarged bore 64 formed in the housing 58. The piston 62 separates an upper chamber 64 from a lower chamber 66, with the chambers being formed radially between the sleeve 54 and the housing 58.

On the left side of FIG. 2, the valve assembly 50 is depicted with the sleeve 54 in its upwardly displaced position, permitting fluid flow through the ports 56. On the right side of FIG. 2, the valve assembly 50 is depicted with the sleeve 54 in its downwardly displaced position, preventing fluid flow through the ports 56. It will be readily appreciated by one skilled in the art that the sleeve 54 is biased to its upwardly displaced position by fluid pressure in the lower chamber 66 exceeding fluid pressure in the upper chamber 64. Similarly, the sleeve 54 is biased to its downwardly displaced position by fluid pressure in the upper chamber 64 exceeding fluid pressure in the lower chamber 66.

Fluid pressure in the chambers 64, 66 is controlled, at least in part, by an addressable actuation control device 68. The control device 68 is in fluid communication with the chambers 64, 66 using passages 70. Additionally, the control device 68 is interconnected to external hydraulic lines 72. When used in the method 10, the valve assembly 50 may be one of multiple well tool assemblies with corresponding control devices 68 interconnected to the hydraulic lines 72.

The control device 68 functions to permit fluid communication between the passages 70 and certain ones of the hydraulic lines 72 when a code or address is present on the hydraulic lines, which code corresponds to an address of the control device. The term "code" is used herein to indicate a combination of pressure levels on a set of hydraulic lines. For example, 1,000 psi may be present on certain ones of the hydraulic lines 72, and 0 psi may be present on others of the hydraulic lines to thereby transmit a particular code corresponding to an address of the control device 68.

Preferably, the pressure levels are static when the code is generated on the hydraulic lines 72, however, it is recognized that, due to the long distances which may be involved in positioning well tools in wells, the fact that a desired fluid pressure may not be instantly generated on a given hydraulic line, etc., a period of time is required to generate the code on the hydraulic lines. Nevertheless, it will be readily appreciated by one skilled in the art that this method of transmitting a code or address via the hydraulic lines 72 is substantially different, and far easier to accomplish, as compared to applying a series of pressure pulses on a hydraulic line. In the latter case, for example, pressure on a hydraulic line is intentionally increased and decreased repeatedly, and a code or address is not generated on multiple hydraulic lines, but is instead generated on a single hydraulic line.

Figure 3:
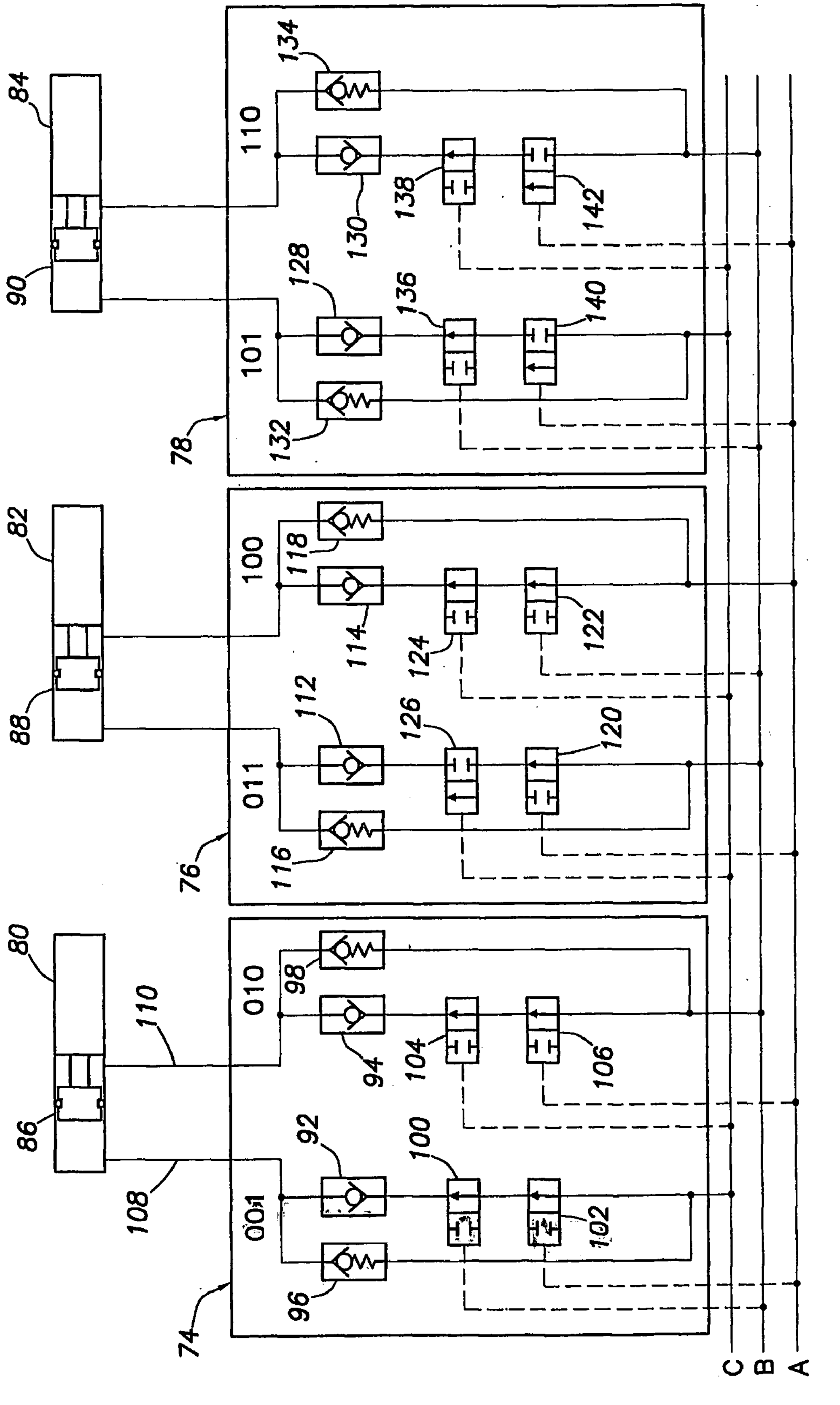
FIG. 3 is a hydraulic schematic of a first well control system embodying principles of the present invention.

Referring additionally now to FIG. 3, a well control system hydraulic schematic is representatively illustrated. The schematic depicts three addressable actuation control devices 74, 76, 78 utilized to control actuation of three corresponding well tools 80, 82, 84 via respective actuators 86, 88, 90. The well tools 80, 82, 84 may be valves, such as valve 52 or valves 48 in the method 10, or they may be another type of well tool. The actuators 86, 88, 90 may be similar to the actuator 60 of the valve assembly 50, and may be used for the actuators 46 in the method 10, or they may be differently configured. Similarly, the control devices 74, 76, 78 may correspond to the control device 68 or the control devices 44 in the method 10.

Figure 4:
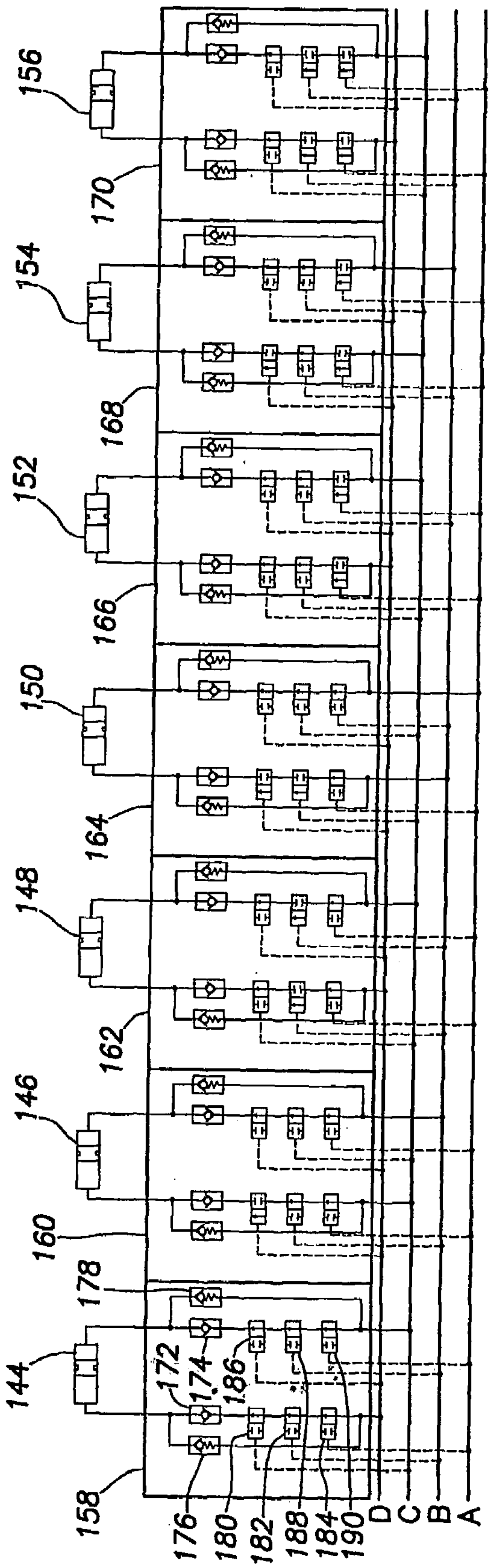
FIG. 4 is a hydraulic schematic of a second well control system embodying principles of the present invention.
Figure 5:
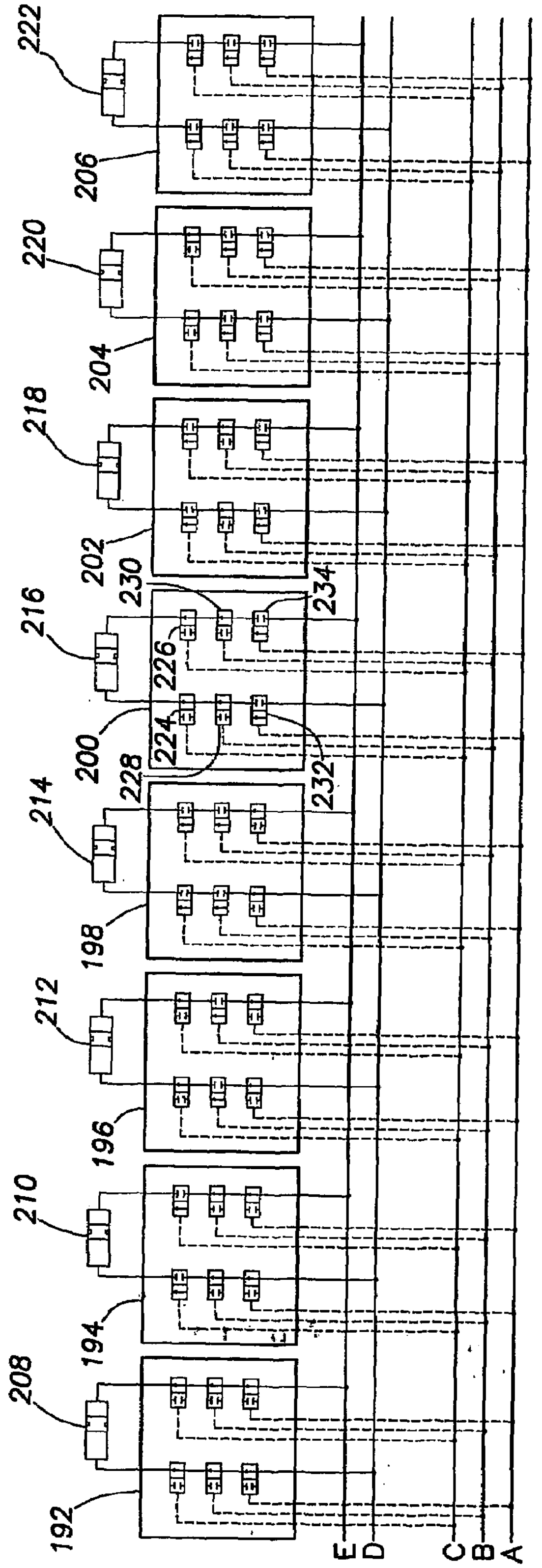
FIG. 5 is a hydraulic schematic of a third well control system embodying principles of the present invention.
Figure 6:
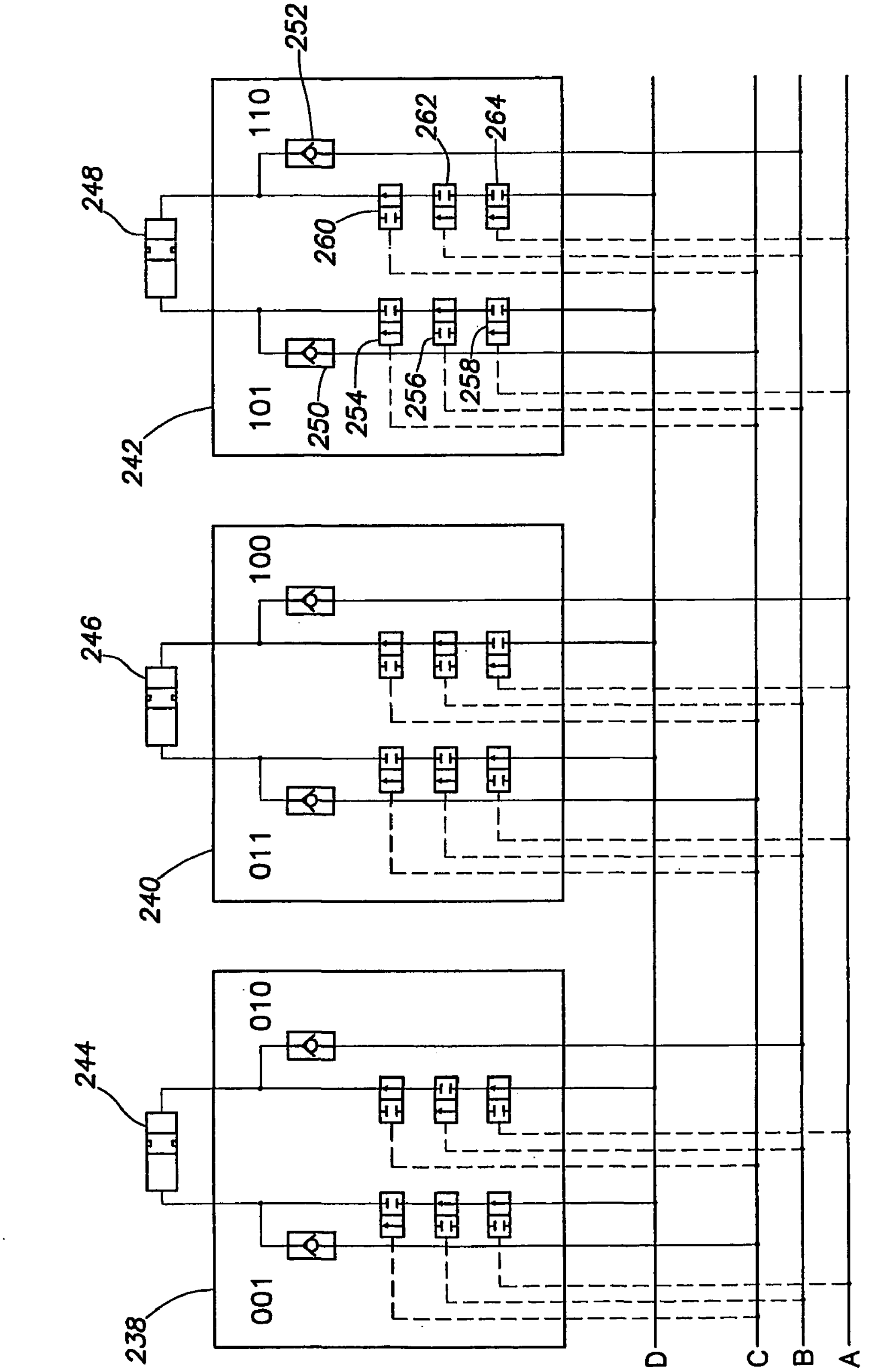
FIG. 6 is a hydraulic schematic of a fourth well control system embodying principles of the present invention.

The hydraulic schematic shown in FIG. 3 is described herein as an example of the manner in which the principles of the present invention provide convenient, simple and reliable control over the operation of multiple well tool assemblies in a well. However, it is to be clearly understood that principles of the present invention may be incorporated into other methods of controlling well tools and, demonstrating that fact, alternate hydraulic schematics are illustrated in FIGS. 4–6 and are described below. Therefore, it may be seen that the descriptions of specific hydraulic schematics herein are not to be taken as limiting the principles of the present invention.

The hydraulic schematic of FIG. 3 demonstrates a manner in which three hydraulic lines (labelled A, B and C in the schematic) may be used in controlling actuation of multiple downhole well tools 80, 82, 84. For the purpose of this example, each of the control devices 74, 76, 78 has been configured to have two addresses. The control device 74 has addresses 001 and 010, the control device 76 has addresses 011 and 100, and the control device 78 has addresses 101 and 110. It will be readily appreciated that these addresses are similar to the type of notation used in digital electronics and sometimes referred to as binary code. In binary code, 1's and 0's are used to refer to the presence or absence of voltage, a state of charge, etc. on elements of an electronic device. In the present description of the hydraulic schematic, the 1's and 0's are used to indicate the presence or absence of a predetermined pressure level on a hydraulic line.

Using one of the addresses, 001, of the control device 74 as an example, the first 0 refers to the absence of the pressure level on hydraulic line A. The second 0 refers to the absence of the pressure level on hydraulic line B. The 1 refers to the presence of the pressure level on hydraulic line C. Therefore, the control device 74 is addressed or selected for control of actuation of the tool 80 by generating the code 001 on the hydraulic lines A, B, C (i.e., the absence of the pressure level on lines A and B, and the presence of the pressure level on line C).

Note that the control device 74 as depicted in FIG. 3 has two addresses, 001 and 010. The use of multiple addresses in the control device 74 permits the use of multiple ways of actuating the tool 80. For example, if the tool 80 is a valve, address 001 may be used to open the valve, and address 010 may be used to close the valve. Of course, more than one of the control devices 74, 76, 78 could have the same address. For example, each of the control devices 74, 76, 78 could have the address 001, so that when this code is generated on the hydraulic lines A, B, C, each of the tools 80, 82, 84 is selected for actuation in the same manner. If the tools 80, 82, 84 are all valves, for example, the code 001 generated on the hydraulic lines A, B, C could select each of the control devices 74, 76, 78 so that all of the valves are to be closed.

For convenience in the further description of the hydraulic schematic depicted in FIG. 3, the tools 80, 82, 84 are assumed to be valves and the predetermined pressure level corresponding to a "1" in the control device addresses is assumed to be 1,000 psi. However, it is to be clearly understood that the tools 80, 82, 84 are not necessarily valves, and the predetermined pressure level may be other than 1,000 psi, without departing from the principles of the present invention. Using these assumptions and the addresses shown in FIG. 3, the following table is given as an example of the manner in which actuation of the valves 80, 82, 84 may be selected using the addresses:

| Address A B C | Actuation |
|---|---|
| 0 0 1 | Open Valve 80 |
| 0 1 0 | Close Valve 80 |
| 0 1 1 | Open Valve 82 |
| 1 0 0 | Close Valve 82 |
| 1 0 1 | Open Valve 84 |
| 1 1 0 | Close Valve 84 |

From the above, it may be readily appreciated that all of the valves 80, 82, 84 may be easily selected for actuation to either a closed or open configuration by merely generating a predetermined pressure level, such as 1,000 psi, on certain ones of the hydraulic lines A, B, C. Furthermore, each of the above addresses is unique, so that only one of the valves is selected for actuation at one time, thereby permitting independent control of each of the valves 80, 82, 84. However, as noted above, it may be desired to have multiple ones of the valves 80, 82, 84 selected for actuation at a time, in which case, the appropriate control devices would be configured to have the same address.

The hydraulic schematic of FIG. 3 graphically demonstrates one of the advantages of the present method over prior hydraulic control methods. That is, relatively few simple conventional hydraulic components are used to control actuation of multiple well tools, without the need for complex unreliable mechanisms or electricity. As illustrated in FIG. 3, only check valves, relief valves and pilot operated valves, which are described in further detail below, are used in the control devices 74, 76, 78.

Control device 74 includes check valves 92, 94, relief valves 96, 98, and normally open conventional pilot operated valves 100, 102, 104, 106. Dashed lines are used in FIG. 3 to indicate connections between the hydraulic lines A, B, C and pilot inputs of the pilot operated valves. For example, hydraulic line A is connected to the pilot inputs of the pilot operated valves 102 and 106. The pilot operated valves 100, 102, 104, 106 are configured so that, when the predetermined pressure level is on the corresponding hydraulic line connected to its pilot input, the valve is operated. Thus, when the predetermined pressure level is on hydraulic line A, valves 102 and 106 open; when the predetermined pressure level is on hydraulic line B, valve 100 opens; and when the predetermined pressure level is on hydraulic line C, valve 104 opens. Of course, if one of the valves 100, 102, 104, 106 is a normally open valve, then the valve would close when the predetermined pressure level is at its pilot input.

To select the valve 80 for actuation to an open configuration, the code 001 is generated on the hydraulic lines A, B, C by generating the predetermined pressure level, 1,000 psi, on hydraulic line C. Note that pilot operated valves 100 and 102 remain open, since pressure is not applied to hydraulic lines A and B, and the pressure on hydraulic line C is transmitted through those pilot operated valves and through check valve 92 to a passage 108 leading to the actuator 86.

The pressure on hydraulic line C is, thus, applied to one side of a piston in the actuator 86. The other side of the actuator 86 piston is connected via a passage 110 to the control device 74. Note that the passages 108, 110 are analogous to the passages 70 of the valve assembly 50 depicted in FIG. 2.

Fluid pressure in passage 110 is not transmitted through the control device 74 to the hydraulic line B, however, unless the pressure is great enough to be transmitted through the relief valve 98, due to the fact that pilot operated valve 104 is closed (because the predetermined fluid pressure is on hydraulic line C). Therefore, the actuator 86 piston is not permitted to displace unless fluid pressure in the passage 110 is great enough to be transmitted through the relief valve 98. Preferably, the relief valve 98 is configured so that it opens at a pressure greater than the predetermined fluid pressure used to transmit the code to the control devices 74, 76, 78. For example, if the predetermined fluid pressure is 1,000 psi, then the relief valve 98 may be configured to open at 1,500 psi. Thus, transmission of the code 001 to the control device 74 selects the valve 80 for actuation thereof, but does not result in the valve being actuated.

To actuate the valve 80 after the code 001 has been transmitted via the hydraulic lines A, B, C to the control device 74, fluid pressure on the hydraulic line C is increased above the predetermined fluid pressure. The increased fluid pressure is transmitted through the relief valve 98 and to the hydraulic line B, thereby permitting displacement of the actuator 86 piston. Displacement of the actuator 86 piston causes the valve 80 to open. Alternatively, the increased fluid pressure could be transmitted through the relief valve 98 and discharged into the well.

To recap the sequence of steps in opening the valve 80, the code 001 is generated on the hydraulic lines A, B, C (the predetermined fluid pressure existing only on hydraulic line C), and then fluid pressure on hydraulic line C is increased to open the valve.

The procedure is very similar to close the valve 80. The code 010 is generated on the hydraulic lines A, B, C (the predetermined fluid pressure existing only on hydraulic line B), thereby closing pilot operated valve 100, with pilot operated valves 102, 104 and 106 remaining open, and then fluid pressure on hydraulic line B is increased to close the valve. In the case of closing the valve 80, the fluid pressure on hydraulic line B is increased to permit its transmission through the relief valve 96 to hydraulic line C. Thus, the hydraulic lines A, B, C are used both to select the valve 80 for actuation thereof, and to supply fluid pressure to perform the actuation.

Note that, if any other codes are generated on the hydraulic lines A, B, C, the valve 80 is not selected for actuation thereof. For example, if the predetermined fluid pressure is generated on hydraulic line A, pilot operated valves 102 and 106 will close, preventing displacement of the actuator 86 piston. The pilot operated valves 100, 102, 104, 106 are configured, and their pilot inputs connected to appropriate ones of the hydraulic lines A, B, C, so that the valve 80 is selected for actuation thereof only when the correct code has been generated on the lines.

The control device 76 includes check valves 112, 114, relief valves 116, 118, normally open pilot operated valves 120, 122, 124, and normally closed pilot operated valve 126. The control device 76 has addresses 011 and 100 for opening and closing the valve 82, and its operation is similar to the operation of the control device 74 described above. When the code 011 is present on the hydraulic lines A, B, C (i.e., the predetermined pressure level is on lines B & C, but not on line A), pilot operated valves 120, 126 are open, permitting fluid pressure in hydraulic line B to be transmitted to the actuator 88. When the fluid pressure exceeds the opening pressure of the relief valve 118 (e.g., 1,500 psi), it is transmitted to hydraulic line A and the valve 82 is opened. When the code 100 is present on the hydraulic lines A, B, C, pilot operated valves 122, 124 are open, permitting fluid pressure in hydraulic line A to be transmitted to the actuator 88. When the fluid pressure exceeds the opening pressure of the relief valve 116, it is transmitted to hydraulic line B and the valve 82 is closed.

The control device 78 includes check valves 128, 130, relief valves 132, 134, normally open pilot operated valves 136, 138, and normally closed pilot operated valves 140, 142. The control device 78 has addresses 101 and 110 for opening and closing the valve 84. When the code 101 is present on the hydraulic lines A, B, C (i.e., the predetermined pressure level is on lines A & C, but not on line B), pilot operated valves 136, 140 are open, permitting fluid pressure in hydraulic line C to be transmitted to the actuator 90. When the fluid pressure exceeds the opening pressure of the relief valve 134 (e.g., 1,500 psi), it is transmitted to hydraulic line B and the valve 84 is opened. When the code 110 is present on the hydraulic lines A, B, C, pilot operated valves 138, 142 are open, permitting fluid pressure in hydraulic line B to be transmitted to the actuator 90. When the fluid pressure exceeds the opening pressure of the relief valve 132, it is transmitted to hydraulic line C and the valve 84 is closed.

The above description of the well control system embodiment of the present invention depicted in FIG. 3 illustrates the ease with which multiple tool assemblies may be controlled using digital hydraulics. In this example, valves 80, 82, 84 are either opened or closed, depending upon the pressure levels on the hydraulic lines A, B, C. However, it is to be clearly understood that the principles of the present invention may be used to perform other functions, such as to vary the configuration of a well tool. For example, the valve 80 could instead be a downhole choke and the level of pressure applied to the choke via the passages 180, 110 could be used to regulate the rate of fluid flow through the choke.

Referring additionally now to FIG. 4, another well control system hydraulic schematic embodying principles of the present invention is representatively illustrated. The hydraulic schematic shown in FIG. 4 is similar in many respects to the hydraulic schematic shown in FIG. 3, but is different in at least two aspects, in that there are seven actuators 144, 146, 148, 150, 152, 154, 156 controlled by respective control devices 158, 160, 162, 164, 166, 168, 170, and in that there are four hydraulic lines A, B, C, D instead of three. Note that well tools actuated by the actuators 144, 146, 148, 150, 152, 154, 156 are not shown in FIG. 4, but it is to be understood that in actual practice a well tool is connected to each of the actuators as described above.

It will be readily appreciated by one skilled in the art that the use of an additional hydraulic line D permits the control of additional well tools, or the use of additional functions with fewer well tools, due to the fact that additional distinct digital hydraulic codes may be on the hydraulic lines. For the example illustrated in FIG. 4, the following table shows the manner in which the actuators 144, 146, 148, 150, 152, 154, 156 may be selected using the addresses:

| Address A B C D | Actuation |
|---|---|
| 0 0 0 1 | Displace Actuator 144 Piston to the Right |
| 0 0 1 0 | Displace Actuator 144 Piston to the Left |
| 0 0 1 1 | Displace Actuator 146 Piston to the Right |
| 0 1 0 0 | Displace Actuator 146 Piston to the Left |
| 0 1 0 1 | Displace Actuator 148 Piston to the Right |
| 0 1 1 0 | Displace Actuator 148 Piston to the Left |
| 0 1 1 1 | Displace Actuator 150 Piston to the Right |
| 1 0 0 0 | Displace Actuator 150 Piston to the Left |
| 1 0 0 1 | Displace Actuator 152 Piston to the Right |
| 1 0 1 0 | Displace Actuator 152 Piston to the Left |
| 1 0 1 1 | Displace Actuator 154 Piston to the Right |
| 1 1 0 0 | Displace Actuator 154 Piston to the Left |
| 1 1 0 1 | Displace Actuator 156 Piston to the Right |
| 1 1 1 0 | Displace Actuator 156 Piston to the Left |

Of course, displacement of an actuator piston to the right may be used to open a valve and displacement of an actuator piston to the left may be used to close a valve, as described above, or the piston displacements may be used for other purposes or in controlling other types of well tools. Additionally, note that each control device 158, 160, 162, 164, 166, 168, 170 has two distinct addresses, but in practice more than one control device may have the same address, a control device may have a number of addresses other than two, etc.

Operation of the well control system of FIG. 4 is very similar to operation of the well control system of FIG. 3 described above. Therefore, only the operation of the control device 158 will be described in detail below, it being understood that the other control devices 160, 162, 164, 166, 168, 170 are operated in very similar manners, which will be readily apparent to one skilled in the art.

The control device 158 includes check valves 172, 174, relief valves 176, 178 and normally open pilot operated valves 180, 182, 184, 186, 188, 190. The control device 158 has addresses 0101 and 0110 for operating the actuator 144. When the code 0101 is present on the hydraulic lines A, B, C, D (i.e., the predetermined pressure level is on lines B & D, but not on lines A or C), pilot operated valves 180, 182, 184 are open, permitting fluid pressure in hydraulic line D to be transmitted to the actuator 144. When the fluid pressure exceeds the opening pressure of the relief valve 178 (e.g., 1,500 psi), it is transmitted to hydraulic line C and the actuator 144 piston is displaced to the right. When the code 0110 is present on the hydraulic lines A, B, C, D, pilot operated valves 186, 188, 190 are open, permitting fluid pressure in hydraulic line C to be transmitted to the actuator 144. When the fluid pressure exceeds the opening pressure of the relief valve 176, it is transmitted to hydraulic line D and the actuator 144 piston is displaced to the left.

Thus, the well control system of FIG. 4 demonstrates that any number of hydraulic lines may be utilized to control any number of well tool assemblies, without departing from the principles of the present invention.

Referring additionally now to FIG. 5, another well control system hydraulic schematic is representatively illustrated. The well control system of FIG. 5 is similar in many respects to those depicted in FIGS. 3 & 4 and described above, but differs in at least two substantial aspects in that the hydraulic lines used to select well tool assemblies for actuation thereof are not the same as the hydraulic lines used to deliver fluid pressure to the actuators, and in that each control device has only one address.

The well control system of FIG. 5 utilizes three hydraulic lines A, B, C to select from among eight control devices 192, 194, 196, 198, 200, 202, 204, 206 for actuation of eight respective actuators 208, 210, 212, 214, 216, 218, 220, 222. As with the well control system of FIG. 4 described above, well tools are not shown in FIG. 5, it being understood that the actuators 208, 210, 212, 214, 216, 218, 220, 222 are connected to well tools in actual practice.

Note that the control devices 192, 194, 196, 198, 200, 202, 204, 206 as depicted in FIG. 5 do not include relief valves and, thus, are somewhat less complex as compared to the well control systems of FIGS. 3 & 4. This is due to the fact that there is no need to discriminate in the control devices 192, 194, 196, 198, 200, 202, 204, 206 between the predetermined pressure level needed to address one or more of the control devices and the pressure level needed to operate the actuators 208, 210, 212, 214, 216, 218, 220, 222. Instead, the predetermined pressure level needed to address the control devices 192, 194, 196, 198, 200, 202, 204, 206 is delivered via a source (hydraulic lines A, B, C) different from the source (hydraulic lines D, E) of fluid pressure used to operate the actuators 208, 210, 212, 214, 216, 218, 220, 222. The control devices 192, 194, 196, 198, 200, 202, 204, 206 also do not include check valves, since there is no need to direct fluid flow through relief valves.

The following table shows how pressure levels in the hydraulic lines A, B, C, D, E may be used to control operation of the actuators 208, 210, 212, 214, 216, 218, 220, 222:

| Address | Actuation | |
|---|---|---|
| A B C | D E | |
| 0 0 0 | 1 0 | Displace Actuator 208 Piston to the Right |
| | 0 1 | Displace Actuator 208 Piston to the Left |
| 0 0 1 | 1 0 | Displace Actuator 210 Piston to the Right |
| | 0 1 | Displace Actuator 210 Piston to the Left |
| 0 1 0 | 1 0 | Displace Actuator 212 Piston to the Right |
| | 0 1 | Displace Actuator 212 Piston to the Left |
| 0 1 1 | 1 0 | Displace Actuator 214 Piston to the Right |
| | 0 1 | Displace Actuator 214 Piston to the Left |
| 1 0 0 | 1 0 | Displace Actuator 216 Piston to the Right |
| | 0 1 | Displace Actuator 216 Piston to the Left |
| 1 0 1 | 1 0 | Displace Actuator 218 Piston to the Right |
| | 0 1 | Displace Actuator 218 Piston to the Left |
| 1 1 0 | 1 0 | Displace Actuator 220 Piston to the Right |
| | 0 1 | Displace Actuator 220 Piston to the Left |
| 1 1 1 | 1 0 | Displace Actuator 222 Piston to the Right |
| | 0 1 | Displace Actuator 222 Piston to the Left |

Note that the notation used in the above table differs somewhat as compared to the other tables discussed above in relation to FIGS. 3 & 4. As before, the "1" and "0" for the address hydraulic lines A, B, C indicate the presence and absence, respectively, of a predetermined pressure level on those hydraulic lines. However, the "1" and "0" for the actuation hydraulic lines D, E indicate greater and lesser pressure levels, respectively, as compared to each other. For example, when the hydraulic line D has a "1" indication and the hydraulic line E has a "0" indication in the above table, this means that the pressure level in hydraulic line D is greater than the pressure level in hydraulic line E. Conversely, when the hydraulic line E has a "1" indication and the hydraulic line D has a "0" indication, this means that the pressure level in hydraulic line E is greater than the pressure level in hydraulic line D.

When a particular control device 192, 194, 196, 198, 200, 202, 204 or 206 has been selected by generating its associated address on the hydraulic lines A, B, C, a difference in pressure level between the hydraulic lines D, E is used to operate the corresponding actuator 208, 210, 212, 214, 216, 218, 220 or 222. The difference in pressure level between the hydraulic lines D, E operates the corresponding actuator 208, 210, 212, 214, 216, 218, 220 or 222 because one of the hydraulic lines is connected to one side of the actuator piston and the other hydraulic line is connected to the other side of the actuator piston. Thus, it is not necessary for the pressure level on either of the hydraulic lines D, E to be the predetermined pressure level used to address the control devices 192, 194, 196, 198, 200, 202, 204, 206 via the hydraulic lines A, B, C, but the pressure level on either of the hydraulic lines D, E could be the predetermined pressure level, and this may be preferable in certain circumstances, such as in offshore operations where only a single pressure level may be available for both the addressing and actuation functions of the hydraulic lines.

Since operation of the control devices 192, 194, 196, 198, 200, 202, 204, 206 is similar in most respects to the operation of the control devices in the well control systems of FIGS. 3 & 4 described above, the operation of only one of the control devices 200 will be described below, it being understood that the other control devices 192, 194, 196, 198, 202, 204, 206 are operated in very similar manners, which will be readily apparent to one skilled in the art.

The control device 200 includes normally open pilot operated valves 224, 226, 228, 230 and normally closed pilot operated valves 232, 234. The control device 200 has address 100 for operating the actuator 216. When the code 100 is present on the hydraulic lines A, B, C (i.e., the predetermined pressure level is on line A, but not on lines B or C), pilot operated valves 224, 228, 232 are open, permitting a pressure level in hydraulic line D to be transmitted to the actuator 216. Pilot operated valves 226, 230, 234 are also open, permitting a pressure level in hydraulic line E to be transmitted to the actuator 216. If the pressure level in hydraulic line D is greater than the pressure level in hydraulic line E, the actuator 216 piston is displaced to the right, and if the pressure level in hydraulic line E is greater than the pressure level in hydraulic line D, the actuator 216 piston is displaced to the left.

Thus, the well control system of FIG. 5 demonstrates that different hydraulic lines may be used in addressing the control devices 192, 194, 196, 198, 200, 202, 204, 206 and operating the actuators 208, 210, 212, 214, 216, 218, 220, 222, and that the control devices do not necessarily have two addresses each. It will also be readily appreciated by one skilled in the art that the hydraulic lines D, E are similar to control and balance lines used to control actuation of, for example, subsea test valves. That is, the hydraulic lines D, E are connected to opposing areas of a piston, and fluid pressure applied to one of the lines will result in fluid being displaced in the other line (when the lines are operatively connected to an actuator), so that fluid "U-tubes" in the lines. However, it is to be clearly understood that it is not necessary for actuating hydraulic lines to "U-tube" in this manner. For example, fluid from the actuators 208, 210, 212, 214, 216, 218, 220, 222 may be discharged into the well, as described above.

Referring additionally now to FIG. 6, another well control system hydraulic schematic is representatively illustrated. The well control system of FIG. 6 is similar in many respects to the well control system of FIG. 5, but differs in at least one respect in that fluid pressure used to operate an actuator is delivered by only one hydraulic line D, with other hydraulic lines A, B, C being used to select from among control devices and to provide a balance line for operation of the selected actuator.

The well control system of FIG. 6 includes three control devices 238, 240, 242 and three corresponding actuators 244, 246, 248. As with the well control systems of FIGS. 4 & 5 described above, the actuators 244, 246, 248 are shown apart from the remainder of their respective well tool assemblies, but it is to be understood that each of the actuators is preferably connected to a well tool, such as a valve, in actual practice.

Each of the control devices 238, 240, 242 has two addresses. Of course, it is not necessary for each of the control devices 238, 240, 242 to have two addresses, or for each address to be distinct from the other addresses used. The following table lists the addresses used in the well control system of FIG. 5, and the corresponding mode of operation of the selected actuator:

| Address A B C | Actuation |
|---|---|
| 0 0 1 | Displace Actuator 244 Piston to the Right |
| 0 1 0 | Displace Actuator 244 Piston to the Left |
| 0 1 1 | Displace Actuator 246 Piston to the Right |
| 1 0 0 | Displace Actuator 246 Piston to the Left |
| 1 0 1 | Displace Actuator 248 Piston to the Right |
| 1 1 0 | Displace Actuator 248 Piston to the Left |

Note that the hydraulic line D is not listed in the above table. Hydraulic line D supplies fluid pressure to operate a selected one of the actuators 244, 246, 248 when the actuator has been selected for operation thereof. Thus, if code 001 is generated on the hydraulic lines A, B, C, the actuator 244 is selected and fluid pressure on the hydraulic line D is used to displace the actuator's piston. Therefore, it will be readily appreciated that the actuator piston displacements listed in the above table do not actually occur unless fluid pressure exists on hydraulic line D. The fluid pressure on the hydraulic line D used to displace an actuator piston may or may not be the same as the predetermined pressure level on the hydraulic lines A, B and/or C used to select from among the control devices 238, 240, 242 for operation of the corresponding actuator 244, 246 and/or 248.

Since the hydraulic schematic of FIG. 6 is similar in many respects to hydraulic schematics described above, the operation of only one of the control devices 242 will be described below, it being understood that the other control devices 238,

240 are operated in very similar manners, which will be readily apparent to one skilled in the art.

The control device 242 includes check valves 250, 252, normally open pilot operated valves 256, 260 and normally closed pilot operated valves 254, 258, 262, 264. When the address 101 is generated on the hydraulic lines A, B, C, pilot operated valves 254, 256, 258 are open, thereby permitting fluid communication between the hydraulic line D and the left side of the actuator 248 piston. The right side of the actuator 248 piston is in fluid communication with the hydraulic line B via the check valve 252. Note that the pilot operated valves 260, 262 are closed at this point, preventing fluid communication between the hydraulic line D and the right side of the actuator 248 piston. Fluid pressure in the hydraulic line D may now be used to displace the actuator 248 piston to the right.

When the address 110 is generated on the hydraulic lines A, B, C, pilot operated valves 260, 262, 264 are open, thereby permitting fluid communication between the hydraulic line D and the right side of the actuator 248 piston. The left side of the actuator 248 piston is in fluid communication with the hydraulic line C via the check valve 250. Note that the pilot operated valves 254, 256 are closed at this point, preventing fluid communication between the hydraulic line D and the left side of the actuator 248 piston. Fluid pressure in the hydraulic line D may now be used to displace the actuator 248 piston to the left.

Thus, the well control system of FIG. 6 demonstrates that although a separate hydraulic actuation line may be used to operate an actuator, the hydraulic actuation line may be "U-tubed" or balanced via one of the hydraulic address lines used to select a control device for operation of the actuator.

Figure 7:
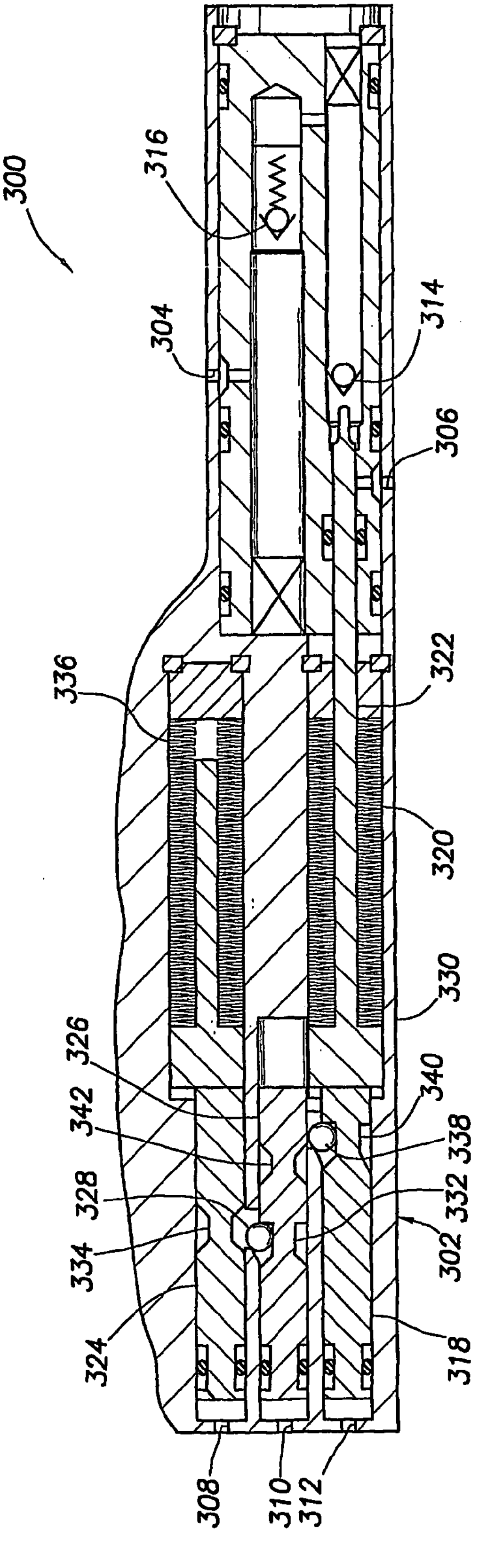
FIG. 7 is a schematic partially cross-sectional view of an actuation control device embodying principles of the present invention.

Referring additionally now to FIG. 7, an actuation control device 300 embodying principles of the present invention is representatively and schematically represented. The control device 300 differs substantially from the control devices described above in at least one respect in that it includes a sequence detector mechanism 302 which permits fluid communication between a hydraulic input 304 of the device and a hydraulic output 306 of the device only when a predetermined fluid pressure is generated in a predetermined sequence at ports 308, 310, 312 of the device. That is, fluid pressure generated at certain of the ports 308, 310, 312 in succession, in an appropriate order, will permit fluid communication between the input port 304 and the output port 306, but otherwise such fluid communication is not permitted.

A check valve 314 prevents fluid flow from the input 304 to the output 306, and a relief valve 316 prevents fluid flow from the output to the input, as depicted in FIG. 7. However, when a piston 318 associated with the port 312 is displaced to the right as viewed in FIG. 7, against the biasing force exerted by a stack of bellville springs 320, an elongated prong 322 is also displaced to the right, pushing the check valve 314 off seat, and thereby permitting fluid flow from the input 304 to the output 306, as long as fluid pressure at the input exceeds fluid pressure at the output by an amount sufficient to open the relief valve 316.

The piston 318 displaces to the right only when the predetermined fluid pressure is applied to correct ones of the ports 308, 310, 312 in the correct sequence. As illustrated in FIG. 7, the correct sequence is to apply the predetermined fluid pressure to port 312 prior to applying the fluid pressure to port 310. Furthermore, if fluid pressure is applied to port 308 prior to applying fluid pressure to either port 310 or port 312, the sequence detector 302 prevents the piston 318 from displacing, even if thereafter the predetermined fluid pressure is applied to port 312 prior to applying the fluid pressure to port 310.

A piston 324 is associated with the port 308, and another piston 326 is associated with the port 310. A ball 328, such as a ball bearing, is disposed in a void formed in a housing 330 of the device 300 between the pistons 324, 326. As depicted in FIG. 7, the ball 328 is received in a radially reduced portion 332 of the piston 326.

If fluid pressure is applied to the port 310, the piston 326 will be permitted to displace to the right, since the ball 328 may be displaced via the void in the housing 330 and be received in another radially reduced portion 334 formed on the piston 324. However, it will be readily appreciated that, if fluid pressure is first applied to the port 308, the piston 324 will be displaced to the right against the biasing force exerted by a stack of bellville springs 336, and the piston 324 will block the ball 328 from displacing through the void, thereby preventing the piston 326 from displacing to the right. Note that the piston 326 may also have a stack of bellville springs, such as the springs 320, 336, associated therewith for biasing the piston 326 to the left, so that a predetermined fluid pressure at the port 310 is needed to displace the piston 326 to the right.

A somewhat similar situation is presented by a ball 338 received in a radially reduced portion 340 formed on the piston 318. As depicted in FIG. 7, the piston 326 prevents the ball 338 from displacing through a void in the housing 330 between the pistons 318, 326. Only when the piston 326 has displaced to the right a sufficient distance to allow the ball 338 to be received in a radially reduced portion 342 will the piston 318 be permitted to displace to the right. Note that, if the piston 326 displaces to the right before fluid pressure at the port 312 overcomes the biasing force of the springs 320, the piston 326 will be permitted to displace to the right a sufficient distance so that the portion 342 is not aligned with the ball 338 (i.e., the piston 326 will "over travel" so that the portion 342 displaces past the ball 338), and displacement of the piston 318 to the right will be prevented.

Therefore, the correct sequence for applying fluid pressure to the ports 310, 312 is to apply the fluid pressure first to the port 312, thereby biasing the piston 318 to the right and urging the ball 338 toward the piston 326, and then to apply the fluid pressure to the port 310, thereby displacing the piston 326 to the right, and aligning the ball 338 with the portion 342. With the ball 338 aligned with the portion 342, the piston 318 is free to displace to the right. No fluid pressure is applied to the port 308 in the sequence.

If fluid pressure sufficient to displace the piston 324 to the right is applied to the port 308 prior to applying pressure to the port 310, an improper sequence is detected by the sequence detector 302 and the check valve 314 cannot be opened. Likewise, if pressure sufficient to displace the piston 326 to the right is applied to the port 310 prior to applying pressure to the port 312, an improper sequence is detected by the sequence detector 302 and the check valve 314 cannot be opened.

Thus, the check valve 314 can only be opened by the piston 318 displacing to the right if pressure is applied first to the port 312 and then to the port 310. Pressure may subsequently be applied to the port 308, but such pressure would have no effect on the sequence detector 302, since the ball 328 bearing against the piston 326 (which would have already displaced to the right) would prevent any substantial displacement of the piston 324 to the right, and the position of the piston 318 would be unaffected.

Many modifications may be made to the representatively illustrated control device 300, without departing from the principles of the present invention. For example, the balls 328, 338 may be replaced with lugs, dogs, collets, or any other type of engagement structure to form, with an associated piston, a latching mechanism for selectively permitting and preventing displacement of the piston 318. The prong 322 and check valve 314 could be replaced by another type of valve device, such as a pilot valve actuated when the piston 318 displaces to the right. The bellville springs 320, 336 could be replaced by another biasing member or device, such as a gas spring. There could be more ports and pistons to produce a more extensive sequence of pressure applications, etc.

It will be readily appreciated that displacement of the piston 318 may be used to accomplish functions other than opening the check valve 314. In this regard, it will also be recognized that the sequence detector 302 may itself be considered an actuator. For example, the prong 322 could instead be a sleeve of a valve, such as the sleeve 54 described above in relation to FIG. 2, so that when the piston 318 displaces, the sleeve is displaced and the valve is opened or closed. Thus, the sequence detector 302 could be configured as an actuator for operating any of a wide variety of devices.

The ports 308, 310, 312 may be interconnected to hydraulic lines in a well control system. If the ports 308, 310, 312 are connected to hydraulic lines A, B, C, respectively, then the appropriate sequence code for selecting the control device 300 may be expressed as 01"1'. The 0 indicates that pressure is not to be applied to the hydraulic line A. The 1" indicates that pressure is to be applied to the hydraulic line B (after pressure is applied to the port 312). The 1' indicates that pressure is to be applied to the hydraulic line C first (before pressure is applied to the port 310).

If, however, the ports 308, 310, 312 are differently interconnected to the hydraulic lines A, B, C, different sequence codes may be produced. For example, if the port 308 is connected to the hydraulic line B, the port 310 is connected to the hydraulic line C and the port 312 is connected to the hydraulic line A, then the appropriate sequence code to select the control device 300 would be expressed as 1'01", signifying the pressure is to be applied to hydraulic line A first, then to hydraulic line C, and no pressure should be applied to hydraulic line B. In this manner, using only the control device 300 interconnected to hydraulic lines in various configurations, many unique sequence codes may be conveniently produced.

Figure 8A:
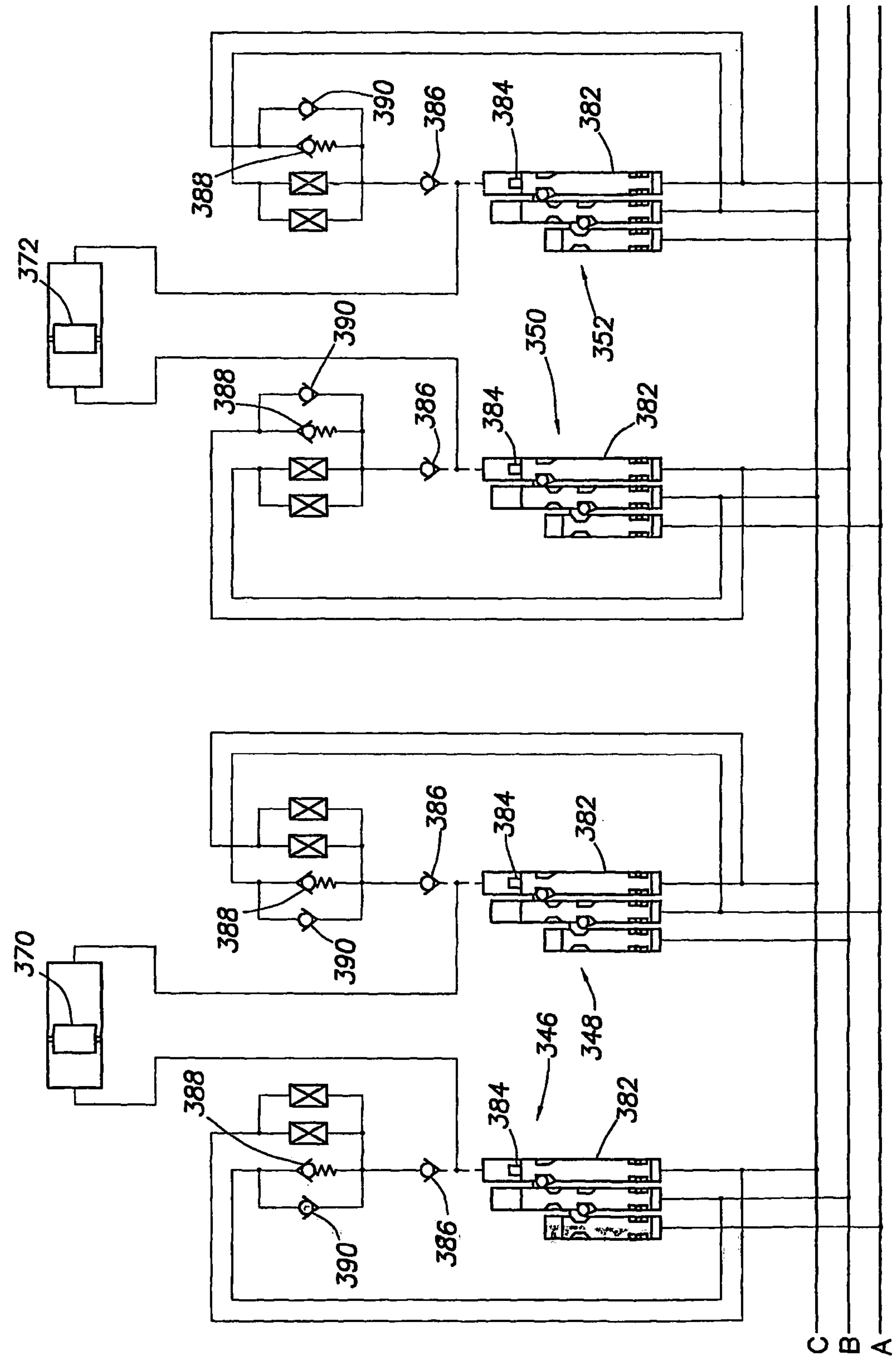
FIGS. 8A–C are a hydraulic schematic of a fifth well control system embodying principles of the present invention.
Figure 8B:
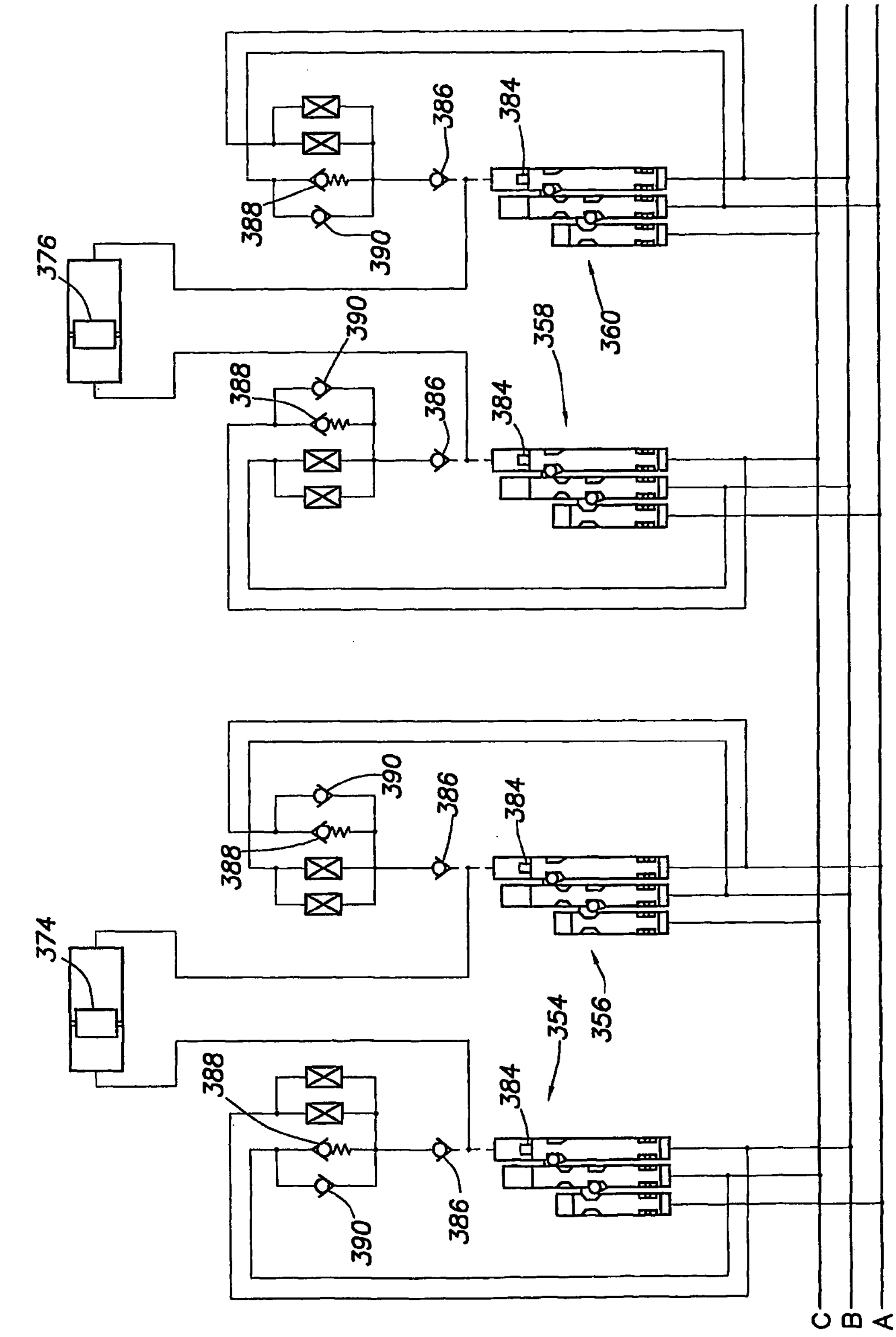
Figure 8C:
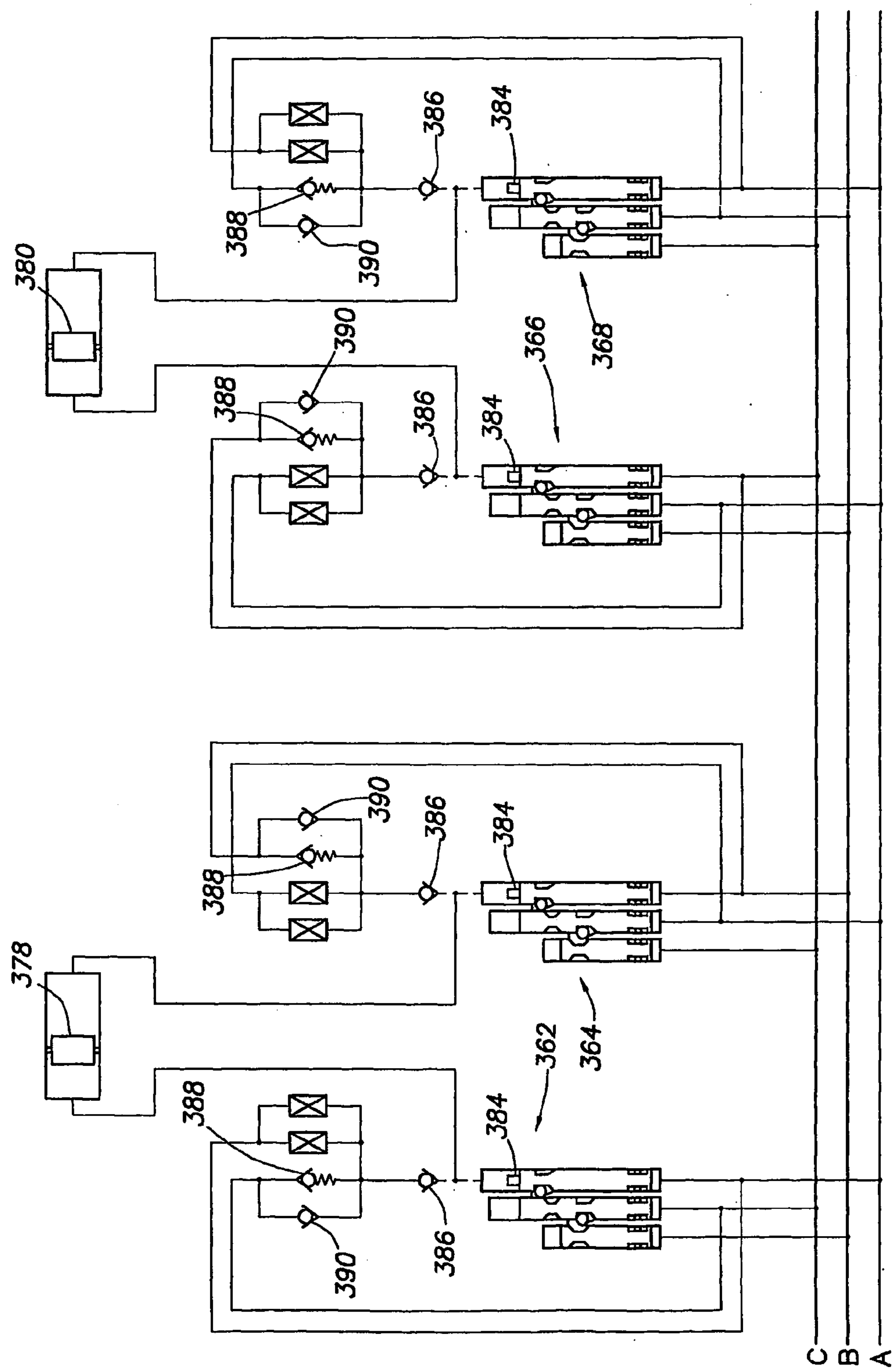

Referring additionally now to FIGS. 8A–C, a well control system hydraulic schematic embodying principles of the present invention is representatively illustrated. This hydraulic schematic utilizes actuation control devices 346, 348, 350, 352, 354, 356, 358, 360, 362, 364, 366, 368 to control displacement of pistons in actuators 370, 372, 374, 376, 378, 380, respectively. The actuators 370, 372, 374, 376, 378, 380 are shown apart from their respective well tool assemblies.

Each of the control devices 346, 348, 350, 352, 354, 356, 358, 360, 362, 364, 366, 368 includes a sequence detector 382, similar to the sequence detector 302 described above, and indicated schematically in FIGS. 8A–C as a series of three pistons. One of the pistons of each sequence detector 382 has a prong 384 which is used to unseat a check valve 386, in a manner similar to that in which the check valve 314 is unseated by the prong 322 described above. A relief valve 388, similar to the relief valve 316 described above, is connected to the respective check valve 386 of each control device 346, 348, 350, 352, 354, 356, 358, 360, 362, 364, 366, 368. In addition, each control device 346, 348, 350, 352, 354, 356, 358, 360, 362, 364, 366, 368 includes another check valve 390 interconnected across the relief valve 388, so that flow through the check valve is permitted in the same direction as flow is permitted through the check valve 386 prior to any of the control devices being selected. The purpose for the check valves 390 will be appreciated from the further description of the hydraulic schematic set forth below.

Considering the control device 346 initially, it may be seen from FIG. 8A that the correct sequence code for selecting the control device is 01"1', that is, pressure is not to be applied to hydraulic line A, pressure is to be applied to hydraulic line B second, and pressure is to be applied to hydraulic line C first. The pressures applied to hydraulic lines B and C should be sufficiently great to displace the corresponding pistons of the sequence detector 382, and accordingly displace the prong 384 to unseat the check valve 386.

Note that hydraulic line B is connected to the relief valve 388. Thus, if pressure on hydraulic line B is sufficient to open the relief valve 388, then when the check valve 386 is opened by the prong 384, hydraulic line B will be placed in fluid communication with the actuator 370 and will bias the piston thereof to the right as viewed in FIG. 8A.

Fluid in the actuator 370 to the right of its piston will be displaced out of the actuator, through the check valves 386, 390 of the control device 348 and to hydraulic line A. Recall that hydraulic line A should not have pressure applied thereto when the control device 346 is selected. Thus, the actuator 370 piston may be displaced to the right by merely applying a first predetermined pressure to hydraulic line C, then to hydraulic line B, and if the first predetermined pressure is not sufficiently great to open the relief valve 388 of the control device 346, increasing the pressure on hydraulic line B to a second predetermined pressure.

Preferably, the first predetermined pressure for each of the control devices 346, 348, 350, 352, 354, 356, 358, 360, 362, 364, 366, 368 is less than that needed to open its associated relief valve 388, so that the pressures on the hydraulic lines A, B, C may be permitted to stabilize prior to operating any of the actuators 370, 372, 374, 376, 378, 380. In this manner, a false sequence code generated due to fluctuations in the pressures on the hydraulic lines, delays in receiving the pressures at the control devices 346, 348, 350, 352, 354, 356, 358, 360, 362, 364, 366, 368, etc. will not cause any of the actuators 370, 372, 374, 376, 378, 380 to be operated.

To displace the actuator 370 piston to the left as viewed in FIG. 8A, the control device 348 is selected by generating sequence code 1"01' on the hydraulic lines A, B, C, that is, pressure is first applied to hydraulic line C, then to hydraulic line A, and not to hydraulic line B. Upon receipt of the appropriate sequence code, the prong 384 opens the check valve 386. An increased pressure is then applied to hydraulic line A, which pressure is transmitted through the relief valve 388 and open check valve 386 to the right side of the actuator 370 piston.

When the actuator 370 piston displaces to the left, fluid on the left side of the piston is displaced through the check valves 386, 390 of the control device 346 to hydraulic line B. Recall that hydraulic line B should not have pressure applied thereto when the control device 348 is selected. Thus, the actuator 370 piston may be displaced to the left by merely applying a first predetermined pressure to hydraulic line C, then to hydraulic line A, and if the first predetermined pressure is not sufficiently great to open the relief valve 388 of the control device 348, increasing the pressure on hydraulic line A to a second predetermined pressure.

Selection of the remaining control devices 350, 352, 354, 356, 358, 360, 362, 364, 366, 368 will not be described further herein, since such selections are similar to the manner in which the control devices 346, 348 are selected as described above. However, the following table lists the sequence codes used in the well control system of FIGS. 8A–C, and the corresponding mode of operation of the selected actuator:

| Sequence Code A B C | Actuation |
|---|---|
| 0 1"p 1' | Displace Actuator 370 Piston to the Right |
| 1"p 0 1' | Displace Actuator 370 Piston to the Left |
| 0 1'p 1" | Displace Actuator 372 Piston to the Right |
| 1'p 0 1" | Displace Actuator 372 Piston to the Left |
| 0 1' 1"p | Displace Actuator 374 Piston to the Right |
| 1'p 1" 0 | Displace Actuator 374 Piston to the Left |
| 0 1" 1'p | Displace Actuator 376 Piston to the Right |
| 1"p 1' 0 | Displace Actuator 376 Piston to the Left |
| 1' 0 1"p | Displace Actuator 378 Piston to the Right |
| 1" 1'p 0 | Displace Actuator 378 Piston to the Left |
| 1" 0 1'p | Displace Actuator 380 Piston to the Right |
| 1' 1"p 0 | Displace Actuator 380 Piston to the Left |

In the above table, the "p" in each sequence code indicates the hydraulic line to which an increased pressure is applied to open the relief valve 388 of the selected control device 346, 348, 350, 352, 354, 356, 358, 360, 362, 364, 366, 368. Note that, other than the "p" designation, the sequence codes for the control devices 346, 358 are the same. Thus, both of the control devices 346, 358 are selected when the sequence code 0 1" 1' is generated on the hydraulic lines A, B, C, but neither of the actuator 370, 376 pistons is displaced until the increased pressure is applied to open the relief valve 388 of one of the selected control devices.

In the same manner, each of the other sequence codes is used twice, with the increased pressure applied a different hydraulic line being used to distinguish between the two. If, however, an increased pressure were not used to cause operation of an actuator after selection of a control device, the number of available sequence codes would be halved.

Note that more than the three hydraulic lines A, B, C may be used in the well control system of FIGS. 8A–C. For example, a fourth hydraulic line D could be used, and it could be interconnected in place of one of the hydraulic lines A, B, C for additional control devices, thereby providing still further possible sequence codes.

Figure 9A:
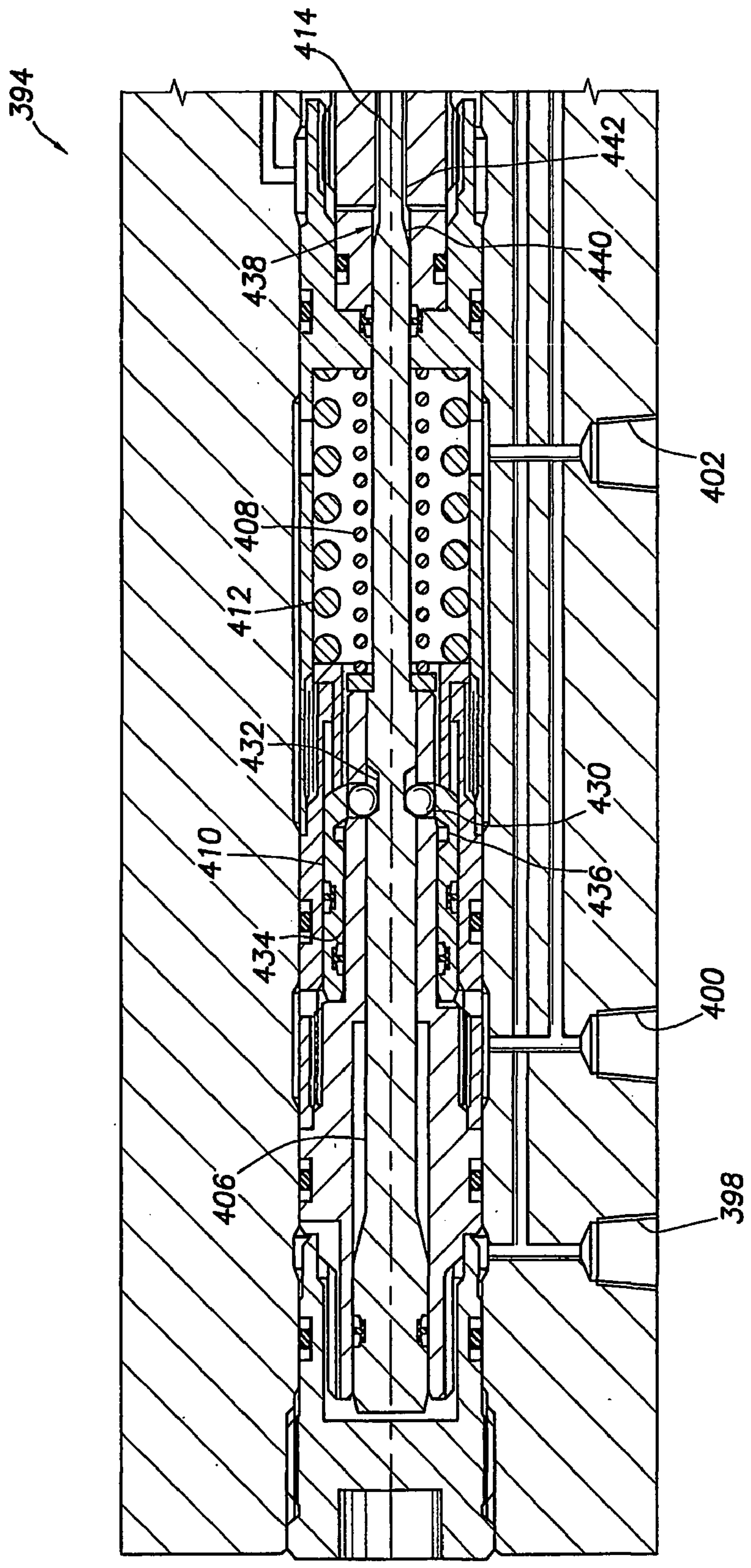
FIGS. 9A & B are schematic partially cross-sectional views of successive axial sections of another actuation control device embodying principles of the present invention.
Figure 9B:
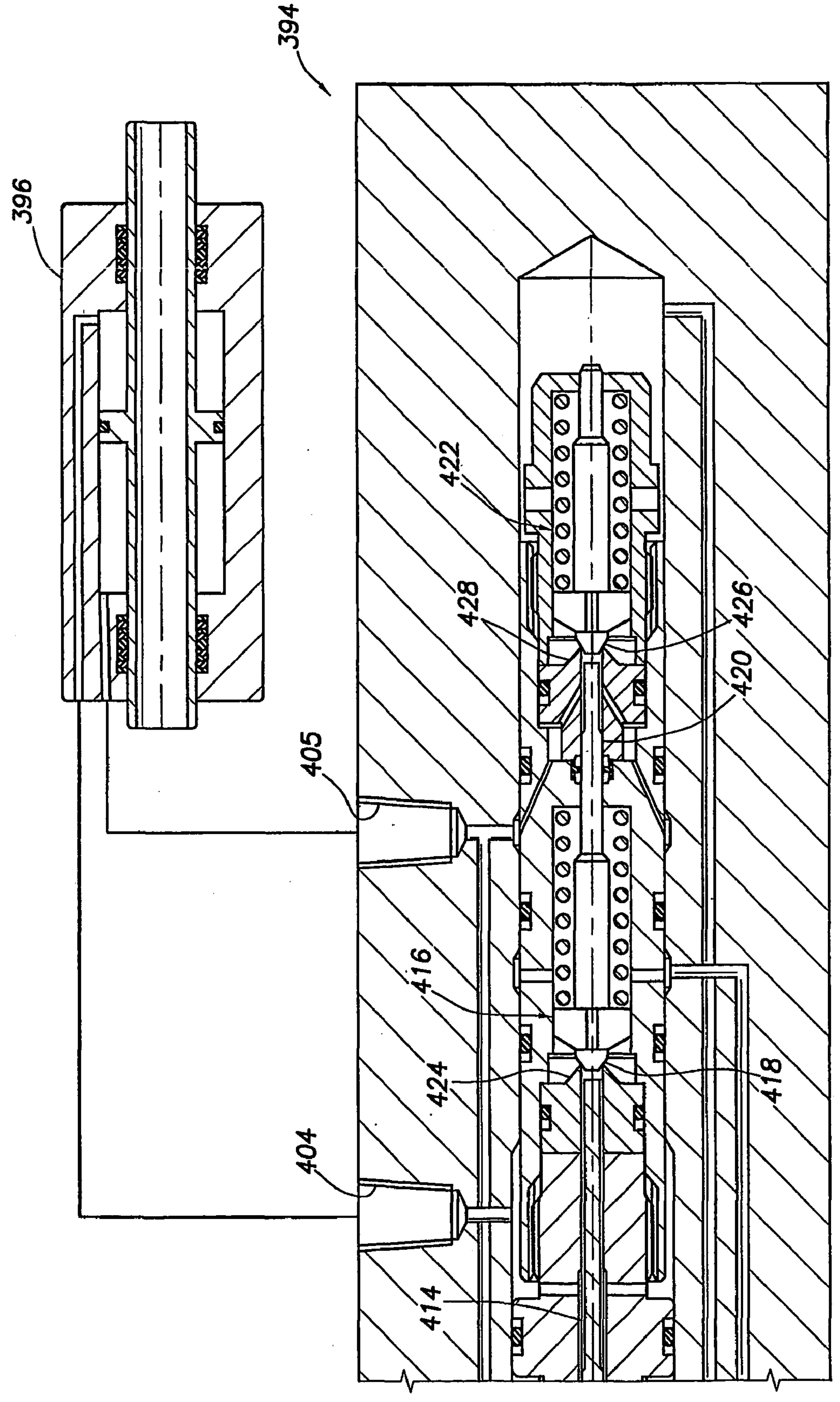

Referring additionally now to FIGS. 9A & B, another actuation control device 394 embodying principles of the present invention is representatively illustrated. The control device 394 is shown schematically interconnected to an actuator 396 apart from a well tool assembly, it being understood that the actuator may be used in any well tool assembly, such as a valve assembly, etc.

The control device 394 is similar in some respects to the control device 300 described above, in that an appropriate sequence of pressure applied successively to ports 398, 400, 402 thereof is used to select the control device 394 for operation of the actuator 396. However, the control device 394 differs substantially from the control device 300 in at least one respect in that the ports 398, 400 used to select the control device are also used to supply pressure to output ports 404, 405 when the control device is selected.

Pressure at input port 398 biases an inner piston 406 to the right as viewed in FIG. 9A, against a biasing force exerted by an inner spring 408. Pressure at input port 400 biases an outer annular piston 410 to the right against a biasing force exerted by an outer spring 412. An elongated prong 414 extends to the right from the inner piston 406 and is representatively formed as a part of the inner piston.

When the inner piston 406 displaces to the right, the prong 414 engages and unseats a check valve 416. The check valve 416 prevents fluid flow from the input port 400 to the output port 404, until the check valve is unseated. A closure member 418 of the check valve 416 has an elongated prong 420 formed thereon and extending to the right. When the check valve 416 is unseated, the prong 420 displaces to the right, and engages and unseats another check valve 422. The check valve 422 prevents fluid flow from the input port 398 to the output port 405, until the check valve is unseated.

Note that the closure member 418 of the check valve 416 is displaced a substantial distance (approximately 0.150–0.200 in.) from a seat 424 of the check valve when the prong 414 unseats it. This is a substantial advantage of the control device 394, since it significantly reduces the possibility of the check valve 416 becoming contaminated with debris lodged between its seat 424 and closure member 418. A closure member 426 of the check valve 422 is also displaced a substantial distance (approximately 0.100–0.150 in.) from a seat 428 of the check valve when the prong 420 unseats it. Thus, the check valve 422 is also resistant to debris contamination between its seat 428 and closure member 426.

The inner piston 406 will only displace to the right in response to pressure being applied to the input port 398 prior to the pressure being applied to the input port 400. This is due to the fact that a series of balls 430 is received in a radially reduced portion 432 of the inner piston 406 through openings in a sleeve 434 positioned radially between the inner and outer pistons 406, 410. The outer piston 410 maintains the balls 430 engaged in the radially reduced portion 432 as depicted in FIG. 9A.

To permit rightward displacement of the inner piston 406, an internal groove 436 formed in the outer piston 410 must be aligned with the balls 430, so that the balls may be received in the groove, releasing the inner piston. The balls 430, sleeve 434 and outer piston 410 thus make up a latch for selectively permitting and preventing displacement of the inner piston 406. This is similar in some respects to the manner in which the piston 326 and ball 383 form a latching device for selectively permitting and preventing displacement of the piston 318 in the control device 300 described above.

If, however, the outer piston 410 is displaced to the right by pressure applied to the input port 400 prior to pressure being applied to the input port 398, the outer piston 410 will "over travel", that is, the groove 436 will displace to the right of the balls 430, and the outer piston will continue to prevent the balls from disengaging from the inner piston 406. Thus, pressure must be applied first to the input port 398, and then to the input port 400, so that when the outer piston 410 displaces to the right, the inner piston 406 will force the balls 430 outward into the groove 436.

The remaining input port 402 is in fluid communication with the right hand ends of the pistons 406, 410 as depicted in FIG. 9A. Therefore, if the pressure is applied to the input port 402, both of the pistons 406, 410 are prevented from displacing to the right. The combination of the pressure at the input port 402 and the associated leftward biasing force of the respective springs 408, 412 will prevent any rightward displacement of the pistons 406, 410. Thus, the pressure must not be applied to the input port 402 when the control device 394 is selected.

Another distinctive feature of the control device 394 is a balance valve 438 associated with the inner piston 406. The balance valve 438 includes a tapered outer portion 440 formed on the inner piston 406 and a similarly tapered seat 442. When the inner piston 406 is in its leftward position as shown in FIG. 9A, the balance valve 438 is open, permitting fluid communication between the output ports 404, 405, and thereby maintaining the actuator 396 in a pressure balanced condition. When the inner piston 406 displaces rightward, however, the balance valve 438 is closed, preventing fluid communication between the output ports 404, 405, and enabling a pressure differential to be created between the output ports to displace the actuator 396 piston.

Therefore, to operate the actuator 396, pressure sufficient to overcome the biasing force of the spring 408 is first applied to the input port 398, and then pressure sufficient to overcome the biasing force of the outer spring 412 is applied to the input port 400. Pressure is not applied to the input port 402.

The pressure applied to the input port 398 biases the inner piston 406 to the right. The pressure applied to the input port 400 displaces the outer piston 410 to the right. When the groove 436 is aligned with the balls 430, they are forced outward and the inner piston 406 displaces to the right.

Rightward displacement of the inner piston 406 opens the check valves 416, 422 and closes the balance valve 438. At this point, the input port 398 is placed in fluid communication with the output port 405, and the input port 400 is placed in fluid communication with the output port 404, and fluid communication between the output ports is prevented by the closed balance valve 438. Pressure may now be increased on the input port 398 to displace the actuator 396 piston to the right, or pressure may be increased on the input port 400 to displace the actuator piston to the left.

Fluid displaced from the actuator 396 when its piston displaces to the right is received in the output port 404 and transmitted through the control device 394 to the input port 400. Fluid displaced from the actuator 396 when its piston displaces to the left is received in the output port 405 and transmitted through the control device 394 to the input port 398. Thus, the fluid transmitted to and from the actuator 396 when it is operated "U-tubes" between the input ports 398, 400. The fluid received from the actuator 396 is not transmitted to the input port 402 to which no pressure was applied, unlike the manner in which the fluid received from the actuator 370 is transmitted to the unpressurized port in the control device 346 of the well control system of FIGS. 8A–C described above.

The control device 394 may be interconnected to three hydraulic lines A, B, C at the input ports 398, 400, 402, similar to the manner in which the control devices 346, 348, 350, 352, 354, 356, 358, 360, 362, 364, 366, 368 are connected to the hydraulic lines in the well control system of FIGS. 8A–C. That is, the hydraulic lines A, B, C may be connected to the input ports 398, 400, 402 to produce different sequence codes. For example, if input port 398 is connected to hydraulic line A, input port 400 is connected to hydraulic line B, and input port 402 is connected to hydraulic line C, the resulting sequence code would be 1'1"0. If input port 398 is connected to hydraulic line C, input port 400 is connected to hydraulic line B, and input port 402 is connected to hydraulic line A, the resulting sequence code would be 01"1'.

Another substantial difference between the control device 394 and the control devices 346, 348, 350, 352, 354, 356, 358, 360, 362, 364, 366, 368 of the well control system of FIGS. 8A–C is that only one of the control device 394 is needed to select an actuator 396 for operation thereof. Thus, only half the number of sequence codes are needed to control operation of the same number of actuators.

Of course, a person skilled in the art would, upon a careful consideration of the above description of representative embodiments of the invention, readily appreciate that many modifications, additions, substitutions, deletions, and other changes may be made to these specific embodiments, and such changes are contemplated by the principles of the present invention. For example, the above examples of embodiments of the present invention have utilized only one predetermined pressure level in selecting one or more control devices for actuation of a corresponding well tool, but it will be readily appreciated that multiple predetermined pressure levels may be used to select a control device, such as by using pilot operated valves which operate in response to different fluid pressures on their pilot inputs. Accordingly, the foregoing detailed description is to be clearly understood as being given by way of illustration and example only, the spirit and scope of the present invention being limited solely by the appended claims.

What is claimed is:

1. An actuation control device for use in a subterranean well, the device comprising:

first and second hydraulic inputs;

first and second hydraulic outputs; and a sequence detecting mechanism, the mechanism placing the first hydraulic input in fluid communication with the first hydraulic output, and placing the second hydraulic input in fluid communication with the second hydraulic output, only when fluid pressure is generated at the first hydraulic input prior to fluid pressure being generated at the second hydraulic input.

2. The device according to claim 1, further comprising a third hydraulic input, and wherein the sequence detecting mechanism prevents fluid communication between the first hydraulic input and the first hydraulic output, and prevents fluid communication between the second hydraulic input and the second hydraulic output, when fluid pressure is generated at the third hydraulic input.

3. The device according to claim 1, wherein the mechanism permits fluid communication between the first and second hydraulic outputs only when fluid pressure has not been generated at the first hydraulic input prior to fluid pressure being generated at the second hydraulic input.

4. The device according to claim 1, wherein the mechanism includes a first piston responsive to fluid pressure generated at the first hydraulic input and a latch responsive to fluid pressure generated at the second hydraulic input, the latch selectively permitting and preventing displacement of the first piston.

5. The device according to claim 4, wherein the latch permits displacement of the first piston only when fluid pressure is generated at the second hydraulic input after fluid pressure is generated at the first hydraulic input.

6. The device according to claim 4, wherein the latch includes an engagement structure, the structure engaging the first piston and thereby preventing displacement of the first piston when fluid pressure is generated at the second hydraulic input before fluid pressure is generated at the first hydraulic input.

7. The device according to claim 4, wherein the latch includes a second piston, the second piston having first, second and third positions relative to the first piston, the latch preventing displacement of the first piston when the second piston is in the first position and when the second piston is in the third position.

8. The device according to claim 7, wherein the second piston is in the first position when fluid pressure has not been generated at the second hydraulic input, wherein the second piston displaces from the first to the third position when fluid pressure is generated at the second hydraulic input prior to fluid pressure being generated at the first hydraulic input, and wherein the second piston displaces from the first to the second position when fluid pressure is generated at the second hydraulic input after fluid pressure has been generated at the first hydraulic input.

9. The device according to claim 1, wherein the sequence detecting mechanism prevents fluid communication between the first and second hydraulic outputs only when fluid pressure is generated at the first hydraulic input prior to fluid pressure being generated at the second hydraulic input.

10. The device according to claim 1, further comprising a valve selectively permitting and preventing fluid communication between the first and second hydraulic outputs.

11. The device according to claim 10, wherein the sequence detecting mechanism closes the valve when fluid pressure is generated at the first hydraulic input prior to fluid pressure being generated at the second hydraulic input.

12. The device according to claim 1, further comprising first and second valves, the first valve selectively permitting and preventing fluid communication between the first hydraulic input and the first hydraulic output, and the second valve selectively permitting and preventing fluid communication between the second hydraulic input and the second hydraulic output.

13. The device according to claim 12, wherein the sequence detecting mechanism includes a member engageable with at least one of the first and second valves for operation thereof.

14. The device according to claim 13, wherein the member engages the first valve and opens the first valve when fluid pressure is generated at the first hydraulic input prior to fluid pressure being generated at the second hydraulic input.

15. The device according to claim 13, wherein at least the first valve is a check valve, and wherein the member engages and opens the check valve, displacing a closure of the check valve a substantial distance relative to a seat of the check valve, when fluid pressure is generated at the first hydraulic input prior to fluid pressure being generated at the second hydraulic input.

16. The device according to claim 1, further comprising a pressure relief valve interconnected to the first hydraulic output, the pressure relief valve permitting fluid flow therethrough only when fluid pressure is generated at the first hydraulic input prior to fluid pressure being generated at the second hydraulic input and fluid pressure generated at the first hydraulic input is greater than a predetermined fluid pressure.

17. An actuator for use in a subterranean well, the device comprising:

an actuator member configured for actuation of a well tool upon displacement of the actuator member;

first and second hydraulic inputs; and a sequence detecting mechanism, the mechanism permitting displacement of the actuator member only when fluid pressure is generated at the first hydraulic input prior to fluid pressure being generated at the second hydraulic input.

18. The actuator according to claim 17, further comprising a third hydraulic input, and wherein the sequence detecting mechanism prevents displacement of the actuator member when fluid pressure is generated at the third hydraulic input.

19. The actuator according to claim 17, wherein the mechanism prevents displacement of the actuator member when fluid pressure has not been generated at the first hydraulic input prior to fluid pressure being generated at the second hydraulic input.

20. The actuator according to claim 17, wherein the mechanism includes a first piston responsive to fluid pressure generated at the first hydraulic input and a latch responsive to fluid pressure generated at the second hydraulic input, the latch selectively permitting and preventing displacement of the first piston.

21. The actuator according to claim 20, wherein the latch permits displacement of the first piston only when fluid pressure is generated at the second hydraulic input after fluid pressure is generated at the first hydraulic input.

22. The actuator according to claim 20, wherein the latch includes an engagement structure, the structure engaging the first piston and thereby preventing displacement of the first piston when fluid pressure is generated at the second hydraulic input before fluid pressure is generated at the first hydraulic input.

23. The actuator according to claim 20, wherein the latch includes a second piston, the second piston having first, second and third positions relative to the first piston, the latch preventing displacement of the first piston when the second piston is in the first position and when the second piston is in the third position.

24. The actuator according to claim 23, wherein the second piston is in the first position when fluid pressure has not been generated at the second hydraulic input, wherein the second piston displaces from the first to the third position when fluid pressure is generated at the second hydraulic input prior to fluid pressure being generated at the first hydraulic input, and wherein the second piston displaces from the first to the second position when fluid pressure is generated at the second hydraulic input after fluid pressure has been generated at the first hydraulic input.

25. The actuator according to claim 20, wherein the actuator member is formed as a part of the first piston.

* * * * *